US009994087B2

(12) United States Patent
Enomoto et al.

(10) Patent No.: US 9,994,087 B2
(45) Date of Patent: Jun. 12, 2018

(54) VEHICULAR HEAT MANAGEMENT SYSTEM

(71) Applicant: DENSO CORPORATION, Kariya, Aichi-pref. (JP)

(72) Inventors: Norihiko Enomoto, Kariya (JP); Nobuharu Kakehashi, Kariya (JP); Yoshiki Katoh, Kariya (JP); Hiroshi Kishita, Kariya (JP); Masamichi Makihara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 106 days.

(21) Appl. No.: 14/898,718

(22) PCT Filed: Jun. 3, 2014

(86) PCT No.: PCT/JP2014/002922
§ 371 (c)(1),
(2) Date: Dec. 15, 2015

(87) PCT Pub. No.: WO2014/203476
PCT Pub. Date: Dec. 24, 2014

(65) Prior Publication Data
US 2016/0129756 A1    May 12, 2016

(30) Foreign Application Priority Data

Jun. 18, 2013    (JP) .................................. 2013-127529
Apr. 11, 2014    (JP) .................................. 2014-081927

(51) Int. Cl.
*B60H 1/00*        (2006.01)
*B60H 1/22*        (2006.01)
(Continued)

(52) U.S. Cl.
CPC ........... *B60H 1/22* (2013.01); *B60H 1/00899* (2013.01); *B60H 1/3204* (2013.01);
(Continued)

(58) Field of Classification Search
CPC .... B60H 1/00899; B60H 1/3204; B60H 1/22; F25B 25/005; F25B 49/02
See application file for complete search history.

(56) References Cited

U.S. PATENT DOCUMENTS 5,490,572 A      2/1996   Tajiri et al.
8,875,532 B2 *  11/2014   Neumeister ............ B60L 1/003
                                                          62/243
(Continued)

FOREIGN PATENT DOCUMENTS

JP    H05262144 A     10/1993
JP    2002248932 A     9/2002
(Continued)

OTHER PUBLICATIONS

International Search Report and Written Opinion (in Japanese with English Translation) for PCT/JP2014/002922, dated Sep. 9, 2014; ISA/JP.

*Primary Examiner* — Len Tran
*Assistant Examiner* — Gordon Jones
(74) *Attorney, Agent, or Firm* — Harness, Dickey & Pierce, P.L.C.

(57) ABSTRACT

A vehicular heat management system has a compressor, a heat-medium heating heat exchanger, and a flow adjustment part. The compressor draws and discharges a refrigerant. The heat-medium heating heat exchanger causes a heat exchange between the refrigerant discharged from the compressor and a heat medium other than air and heats the heat medium. The flow adjustment part causes a flow of a cooling fluid cooling the refrigerant when the compressor is stopped.

(Continued)

The vehicular heat management system further has a refrigeration cycle unit and a refrigerant-flow-path forming member. The refrigeration cycle unit includes devices configuring a refrigeration cycle. The refrigerant-flow-path forming member (i) is disposed in a low-temperature area having an air temperature that is lower than an air temperature in an area in which the refrigeration cycle unit is disposed, and (ii) passes a refrigerant in the refrigeration cycle flows.

7 Claims, 16 Drawing Sheets

(51) Int. Cl.
    *F25B 25/00* (2006.01)
    *F25B 49/02* (2006.01)
    *B60H 1/32* (2006.01)

(52) U.S. Cl.
    CPC ............ F25B 25/005 (2013.01); F25B 49/02 (2013.01); *F25B 2339/047* (2013.01); *F25B 2500/27* (2013.01); *F25B 2600/13* (2013.01); *F25B 2700/1931* (2013.01); *F25B 2700/1933* (2013.01); *F25B 2700/21151* (2013.01); *F25B 2700/21152* (2013.01)

(56) References Cited

U.S. PATENT DOCUMENTS

| | | | |
|---|---|---|---|
| 2002/0014330 A1* | 2/2002 | Guyonvarch | B60H 1/00007 165/202 |
| 2004/0050089 A1* | 3/2004 | Amaral | B60H 1/00464 62/324.1 |
| 2011/0113800 A1 | 5/2011 | Sekiya et al. | |
| 2011/0197608 A1* | 8/2011 | Yamashita | F24F 3/06 62/190 |
| 2012/0210746 A1 | 8/2012 | Kadle et al. | |
| 2013/0146271 A1 | 6/2013 | Schafer et al. | |

FOREIGN PATENT DOCUMENTS

| | | |
|---|---|---|
| JP | 2008265686 A | 11/2008 |
| JP | 2011105150 A | 6/2011 |
| WO | WO-2012075975 A1 | 6/2012 |
| WO | WO-2012112760 A1 | 8/2012 |

\* cited by examiner

VEHICULAR HEAT MANAGEMENT SYSTEM

CROSS REFERENCE TO RELATED APPLICATIONS

This application is a U.S. National Phase Application under 35 U.S.C. 371 of International Application No. PCT/JP2014/002922 filed on Jun. 3, 2014 and published in Japanese as WO 2014/203476 A1 on Dec. 24, 2014. This application is based on and claims the benefit of priority from Japanese Patent Application No. 2013-127529 filed on Jun. 18, 2013 and Japanese Patent Application No. 2014-081927 filed on Apr. 11, 2014. The entire disclosures of all of the above applications are incorporated herein by reference.

TECHNICAL FIELD

The present disclosure relates to a vehicular heat management system that is used in a vehicle.

BACKGROUND ART

Conventionally, a relief valve is installed in a refrigeration cycle device mounted on a vehicle as a safety apparatus provided for an excess increase in pressure of a refrigerant. The relief valve has a role to release the pressure of the refrigerant to outside the refrigeration cycle device by opening when the pressure of the refrigerant becomes higher than or equal to a predetermined pressure.

A reason of the excess increase of a refrigerant pressure is that, for example, an atmospheric temperature around the refrigeration cycle device increases to a high temperature when the refrigeration cycle device is stopped (i.e., when a compressor is stopped). In other words, principal devices of the refrigeration cycle device is disposed in an engine room, and the temperature of the engine room becomes very high due to heat generated from engine devices such as an engine and an engine radiator, solar insolation during summer and the like. Consequently, the temperature of the refrigerant in the refrigeration cycle device also becomes very high, and the pressure of the refrigerant increases excessively.

In contrast, in Patent Literature 1, a vehicular air conditioning device that performs air conditioning in a vehicle compartment by using a coolant heated or cooled by the refrigeration cycle device is described. Specifically, in a condenser which constitutes part of the refrigeration cycle device, a coolant is heated by a heat exchange caused between a high-temperature refrigerant and the coolant, and the coolant is cooled by a heat exchange caused between a low-temperature refrigerant and the coolant in a chiller which constitutes part of the refrigeration cycle device.

PRIOR ART LITERATURES

Patent Literature

Patent Literature 1: WO 2012/112760 A1

SUMMARY OF INVENTION

However, according to the study of inventors of the present application, in the related art disclosed in Patent Literature 1, since heat is exchanged between the high-temperature refrigerant and the coolant in the condenser, there is a probability that pressure of the refrigerant tends to increase excessively when the refrigeration cycle device is stopped (i.e., when the compressor is stopped) as compared with the case where heat is exchanged between the high-temperature refrigerant and outside air in the condenser.

In other words, in the case where heat is exchanged between the high-temperature refrigerant and the outside air in the condenser, heat of the refrigerant is naturally radiated, and hence an increase in the pressure of the refrigerant is restricted. In contrast, in the case where heat is exchanged between the high-temperature refrigerant and the coolant by the condenser as in the related art in Patent Literature 1, natural radiation of the heat of the refrigerant is difficult, and hence the pressure of the refrigerant tends to increase excessively.

Consequently, an event that the relief valve is opened and the refrigerant is released to the atmosphere tends to occur. In addition, with an increase of the period during which the pressure of the refrigerant is high, the lifetime of the components and piping in the refrigeration cycle becomes short.

In view of such points described above, it is an objective of the present disclosure to restrict an excess increase of a pressure of a refrigerant.

To achieve the above objective, a vehicular heat management system has a compressor, a heat-medium heating heat exchanger, and a flow adjustment part. The compressor draws and discharges a refrigerant. The heat-medium heating heat exchanger causes a heat exchange between the refrigerant discharged from the compressor and a heat medium other than air and heats the heat medium. The flow adjustment part causes a flow of a cooling fluid cooling the refrigerant when the compressor is stopped.

Accordingly, even when the compressor is stopped, the refrigerant can be cooled by causing a cooling fluid to flow. Therefore, an excess increase in pressure of the refrigerant is restricted.

Alternatively, a vehicular heat management system of the present disclosure may have a compressor, a heat-medium heating heat exchanger, a decompression part, a heat-medium cooling heat exchanger, a heat-medium-air heat exchanger, a pump, a blower, and a control section. The compressor draws and discharges a refrigerant. The heat-medium heating heat exchanger causes a heat exchange between a refrigerant discharged from the compressor and a heat medium other than air to heat the heat medium. The decompression part decompresses or expands the refrigerant after exchanging heat in the heat-medium heating heat exchanger. The heat-medium cooling heat exchanger cools the heat medium by a heat exchange between the refrigerant decompressed and expanded in the decompression part and the heat medium. The heat-medium-air heat exchanger causes a heat exchange between the heat medium and air. The pump circulates the heat medium to the heat-medium cooling heat exchanger and the heat-medium-air heat exchanger. The blower blows the air to the heat-medium-air heat exchanger. The control section operates the compressor, the pump, and the blower when the compressor is stopped and when a pressure or a temperature of the refrigerant is determined to be higher than a predetermined value or is estimated to exceed the predetermined value.

In this configuration, when the pressure of the refrigerant is determined to be increasing or is estimated to increase after the compressor is stopped, the heat medium can flow, air can flow in the heat-medium-air heat exchanger, and the refrigerant can be circulated. Therefore, the refrigerant can be cooled and an excess increase of pressure of the refrigerant is restricted.

Alternatively, a vehicular heat management system of the present disclosure may have a compressor, a heat-medium heating heat exchanger, a decompression part, a heat-medium cooling heat exchanger, a heat-medium-air heat exchanger, a pump, an internal-combustion-engine cooling heat exchanger, a blower, and a control section.

The compressor draws and discharges a refrigerant. The heat-medium heating heat exchanger causes a heat exchange between a refrigerant discharged from the compressor and a heat medium other than air to heat the heat medium. The decompression part decompresses and expands the refrigerant after exchanging heat in the heat-medium heating heat exchanger. The heat-medium cooling heat exchanger cools the heat medium by a heat exchange between the refrigerant decompressed and expanded in the decompression part and the heat medium. The heat-medium-air heat exchanger causes a heat exchange between the heat medium and air. The pump circulates the heat medium to the heat-medium cooling heat exchanger and the heat-medium-air heat exchanger. The internal-combustion-engine cooling heat exchanger causes a heat exchange between air and an internal-combustion-engine cooling medium cooling an internal combustion engine. The blower blows air to the internal-combustion-engine cooling heat exchanger. The air-blow control section operates the blower when the internal combustion engine and the compressor are stopped and when a pressure or a temperature of the refrigerant is determined to be higher than a predetermined value or is estimated to exceed the predetermined value.

Accordingly, since an internal-combustion-engine cooling medium can radiates heat to the air to reduce residual heat of the internal combustion engine even when the compressor is stopped, a temperature of the refrigerant is restricted from increasing by being heated by the residual heat of the internal combustion engine. Consequently, an excess increase in pressure of the refrigerant is restricted.

Alternatively, a vehicular heat management system of the present disclosure may have a refrigeration cycle unit and a refrigerant-flow-path forming member.

The refrigeration cycle unit includes devices configuring a refrigeration cycle. The refrigerant-flow-path forming member is disposed in a low-temperature area having an air temperature that is lower than an air temperature in an area in which the refrigeration cycle unit is disposed. The refrigerant-flow-path forming member forms a flow path in which a refrigerant in the refrigeration cycle flows.

Accordingly, even when the compressor is stopped, the refrigerant can be cooled by natural convection of the refrigerant. Therefore, an excess increase in pressure of the refrigerant is restricted.

DESCRIPTION OF EMBODIMENTS

Figure 1:
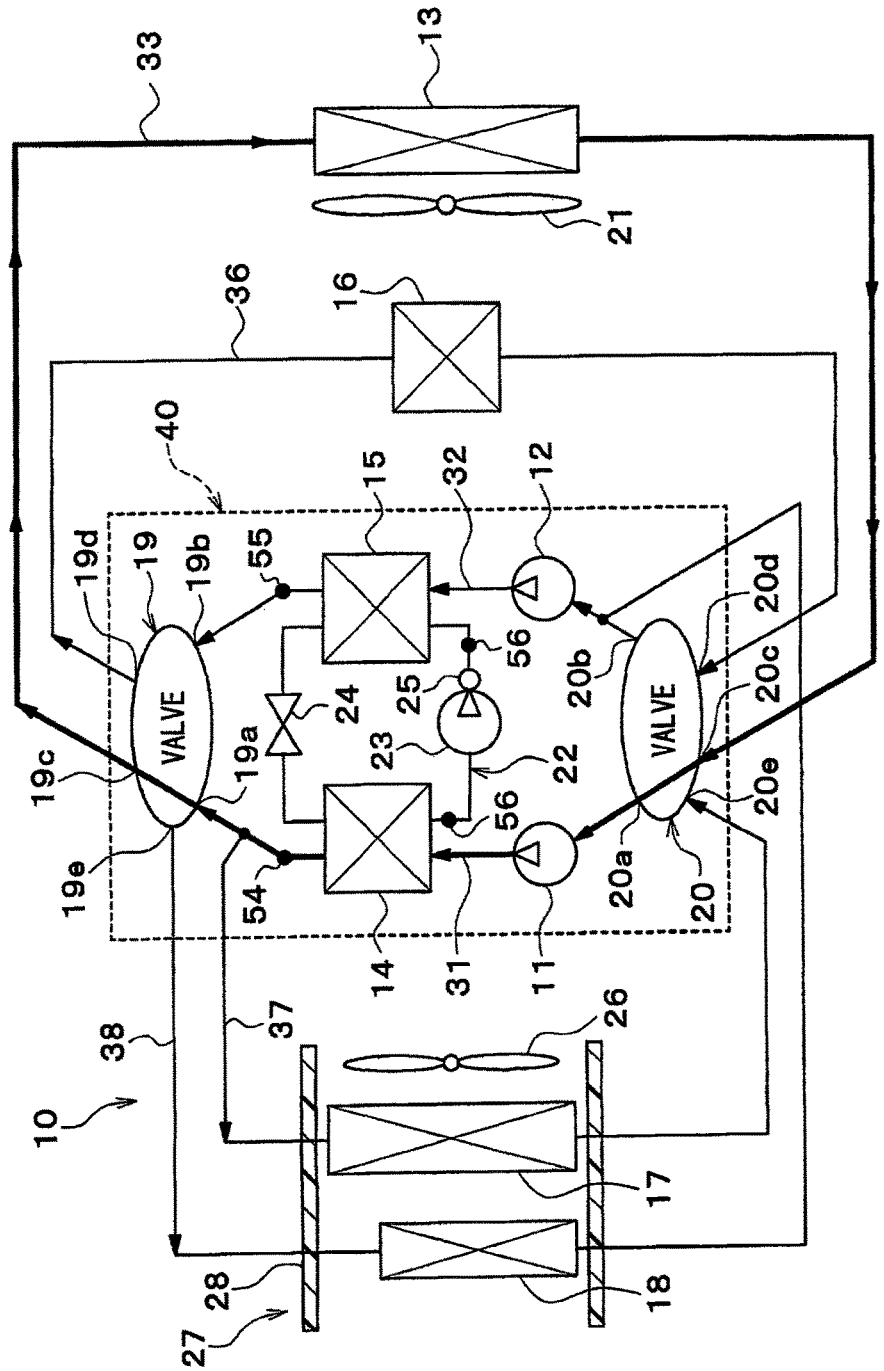
FIG. 1 is a general configuration drawing illustrating a vehicular heat management system according to a first embodiment.

Embodiments will be described with reference to the drawings below. In the following respective embodiments, parts identical with or equivalent to each other are denoted by the same symbols in the drawings.

First Embodiment

A vehicular heat management system 10 shown in FIG. 1 is used to appropriately adjust temperatures of various devices provided in a vehicle and a vehicle compartment. In the present embodiment, the vehicular heat management system 10 is applied to a hybrid vehicle that obtains a drive force for the traveling of the vehicle from an engine (i.e., an internal combustion engine) and a traveling electric motor.

The hybrid vehicle of the present embodiment is a plug-in hybrid vehicle that can charge a battery (i.e., an in-vehicle battery), which is mounted on the vehicle, with an electric power that is supplied from an external power supply (i.e., a commercial power supply) at a time when the vehicle stops. For example, a lithium-ion battery can be used as the battery.

The drive force, which is output from the engine, is not only used for the traveling of the vehicle, but also used for the operation of a generator. Further, an electric power generated by a generator and an electric power supplied from the external power supply can be stored in the battery, and the electric power stored in the battery is supplied to not only the traveling electric motor but also various vehicle-mounted devices including electric components configuring the vehicular heat management system 10.

As illustrated in FIG. 1, the vehicular heat management system 10 includes a first pump 11, a second pump 12, a radiator 13, a coolant cooler 14, a coolant heater 15, a device 16, a cooler core 17, a heater core 18, a first switching valve 19, and a second switching valve 20.

The first pump 11 and the second pump 12 are electric pumps that draw and discharge a coolant (i.e., a heat medium). The coolant is a fluid serving as a heat medium. In the present embodiment, the coolant can be a liquid containing at least ethylene glycol, dimethylpolysiloxane or nanofluid, or antifreeze material.

The radiator 13, the coolant cooler 14, the coolant heater 15, and the device 16 are coolant circulation device (i.e., a heat medium circulation device) in which the coolant flows.

The radiator 13 is a heat exchanger (i.e., a heat medium-outside air heat exchanger, a heat-medium-air heat exchanger) that exchanges heat between the coolant and outside air (i.e., air outside of the vehicle compartment). The radiator 13 functions as a radiator that radiates heat of a coolant to the outside air when the temperature of the coolant is higher than the temperature of the outside air, and functions as a heat absorber in which the coolant absorbs heat of the outside air when the temperature of the coolant is lower than the temperature of the outside air.

The outside air is blown by an exterior blower 21 to the radiator 13. The exterior blower 21 is a blower that blows the outside air to the radiator 13 and is composed of an electric blower. The radiator 13 and the exterior blower 21 are disposed in a foremost portion of the vehicle. For that reason, a traveling wind can be applied to the radiator 13 when the vehicle travels.

The coolant cooler 14 is a cooler that cools the coolant. Specifically, the coolant cooler 14 is a low-pressure side heat exchanger (i.e., a heat-medium cooling heat exchanger or a heat medium refrigerant heat exchanger) that cools the coolant by exchanging heat between a low-pressure side refrigerant of a refrigeration cycle 22 and the coolant. A coolant inlet side (i.e., a heat-medium inlet side) of the coolant cooler 14 is connected to a coolant discharge side (i.e., a heat-medium discharge side) of the first pump 11.

The coolant heater 15 is a heater that heats the coolant. Specifically, the coolant heater 15 is a high-pressure side heat exchanger (i.e., a heat-medium heating heat exchanger, a heat medium refrigerant heat exchanger) that heats the coolant by exchanging heat between a high-pressure side refrigerant of the refrigeration cycle 22 and the coolant. A coolant inlet side (i.e., a heat-medium inlet side) of the coolant heater 15 is connected to a coolant outlet side (i.e., a heat-medium outlet side) of the second pump 12.

The refrigeration cycle 22 is a vapor compression type freezer provided with a compressor 23, a coolant heater 15, an expansion valve 24, and a coolant cooler 14. The refrigeration cycle 22 of the present embodiment uses a fluorocarbon refrigerant as the refrigerant, and configures a sub-critical refrigeration cycle in which a high pressure-side refrigerant pressure does not exceed a critical pressure of the refrigerant.

The compressor 23 is an electric compressor that is driven by electric power supplied from a battery, and sucks in, compresses, and discharges the refrigerant of the refrigeration cycle 22. A relief valve 25 is disposed on the coolant discharge side of the compressor 23. The relief valve 25 is a pressure releasing member that releases the pressure of the refrigerant to the outside of the refrigeration cycle 22 by being opened when the pressure of the refrigerant becomes higher than or equal to a predetermined pressure.

The coolant heater 15 is a condenser that condenses the high-pressure side refrigerant by exchanging heat between the high pressure side refrigerant discharged from the compressor 23 and the coolant. The expansion valve 24 is a decompression part for decompressing and expanding a liquid-phase refrigerant flowing out of the coolant heater 15.

The coolant cooler 14 is an evaporator that evaporates a low-pressure refrigerant by exchanging heat between the low-pressure refrigerant decompressed and expanded by the expansion valve 24 and the coolant. A gas-phase refrigerant evaporated by the coolant cooler 14 is drawn into the compressor 23, and compressed.

The radiator 13 cools the coolant by the outside air, and the coolant cooler 14 cools the coolant by the low-pressure refrigerant of the refrigeration cycle 22. Therefore, the radiator 13 cannot cool the coolant to the temperature lower than the temperature of the outside air whereas the coolant cooler 14 can cool the coolant to the temperature lower than the temperature of the outside air. In other words, a temperature of the coolant cooled by the coolant cooler 14 can be lower than a temperature of the coolant cooled by the radiator 13.

The device 16 is a device (i.e., a temperature-adjustment-target device) including a flow path in which coolant flows, in which heat is received by the coolant. Examples of the device 16 include an inverter, a battery, a battery temperature-control heat exchanger, a traveling electric motor, an engine device, cold accumulator, an exhaust-heat recovering heat exchanger, a coolant-coolant heat exchanger, and the like.

The inverter is an electric power conversion device that converts a DC power, which is supplied from the battery, into an AC voltage and outputs the AC voltage to the traveling electric motor.

The battery temperature-control heat exchanger is a heat exchanger (i.e., an air-heat medium heat exchanger) that is disposed in an air-blowing path through which air is delivered to the battery, and that causes a heat exchange between air and the coolant.

The engine device include, for example, a turbocharger, an intercooler, an EGR cooler, a CVT warmer, a CVT cooler, an exhaust heat recovering device, and the like.

The turbocharger is a supercharger that supercharges a drawn air (i.e., an intake air) of the engine. The intercooler is an intake-air cooler (i.e., an intake-air heat-medium heat exchanger) that causes a heat exchange between super-charged intake air that has compressed by the turbocharger and hence has a high temperature and a coolant to cool the supercharged intake air.

The EGR cooler is an exhaust air-coolant heat exchanger (i.e., the exhaust-air heat-medium heat exchanger) that cools the exhaust air by exchanging heat between the engine exhaust gas (i.e., exhaust air) returned to an air-intake side of the engine and the coolant.

The CVT warmer is a lubricant-coolant heat exchanger (i.e., lubricant heat-medium heat exchanger) that exchanges heat between a lubricant (i.e., CVT oil) that lubricates the CVT (Continuously Variable Transmission) and the coolant to heat the CTV oil.

The CVT cooler is a lubricant-coolant heat exchanger (i.e., lubricant heat-medium heat exchanger) that exchanges heat between the CVT oil and the coolant to cool the CTV oil.

The exhaust heat recovering device is an exhaust air-coolant heat exchanger (i.e., exhaust-air heat-medium heat exchanger) that exchanges heat between exhaust air and a coolant such that the coolant absorbs heat of the exhaust air.

The cold accumulator accumulates heat or cold of a coolant. Examples of the cold accumulator include a chemical heat accumulator, a heat-retention tank, a latent heat-type heat accumulator (e.g., paraffin and hydrated substances) and the like.

The exhaust-heat recovering heat exchanger is a heat exchanger that recovers heat (cold or hot) discharged to the outside by air ventilation. For example, by recovering heat (cold or hot) to be discharged to the outside by air ventilation, the exhaust-heat recovering heat exchanger may reduce a motive power required for a cooling operation and a heating operation.

The coolant-coolant heat exchanger is a heat exchanger that causes a heat exchange between a coolant and a coolant. For example, coolant-coolant heat exchanger can exchange heat between the vehicular heat management system 10 and the engine cooling circuit by exchanging heat between a coolant in the vehicular heat management system 10 (i.e., a coolant circulated by the first pump 11 or the second pump 12) and a coolant in the engine cooling circuit (i.e., a circuit in which a coolant for cooling the engine circulates).

The cooler core 17 is an air-cooling heat exchanger (i.e., an air cooler) that exchanges heat between a coolant and air to the vehicle compartment to cool the air blown into the vehicle compartment. Therefore, the coolant cooled by the coolant cooler 14, a device or the like which generates cold needs to flow in the cooler core 17.

The heater core 18 is an air-heating heat exchanger (i.e., an air heater) that exchanges heat between air blown to the vehicle compartment and a coolant to heat the air blown into the vehicle compartment. Therefore, the coolant heated by the coolant heater 15, the device or the like which generates a warm heat needs to flow in the heater core 18.

Inside air (i.e., air in the vehicle compartment), outside air, or mixture of the inside air and the outside air is blown to cooler core 17 and the heater core 18 by an interior blower 26. The interior blower 26 is a blower that blows the air to the cooler core 17 and the heater core 18 and is composed of an electric blower.

The cooler core 17, the heater core 18, and the interior blower 26 are stored in a casing 28 of an interior air conditioning unit 27 of the vehicular air conditioning device. The interior air conditioning unit 27 is disposed inside a dashboard panel (i.e., an instrument panel) of the foremost portion of the vehicle compartment. The casing 28 forms an outline of the interior air conditioning unit 27.

The casing 28 forms an air passage of the air which is blown into the vehicle compartment, and is made of a resin (e.g., polypropylene) having some degree of elasticity and is excellent in strength.

An inside and outside air switching part (not illustrated) is disposed on the upstream most side of a flow of air in the vehicle compartment within the casing 28. The inside and outside air switching part is an inside and outside air introducing portion that selectively introduces the inside air and the outside air into the casing 28.

Opening holes blow a conditioned air of which temperature is adjusted by the cooler core 17 and the heater core 18 into the vehicle compartment, which is a space to be air-conditioned are provided at the downstream most portion of a flow of air in the casing 28.

The first pump 11 is disposed on a first pump flow path 31. The coolant cooler 14 is disposed on a coolant discharge side of the first pump 11 on the first pump flow path 31. The second pump 12 is disposed on a second pump flow path 32. The coolant heater 15 is disposed on a coolant discharge side of the second pump 12 on the second pump flow path 32.

The radiator 13 is disposed on a radiator flow path 33. The device 16 is disposed in the device flow path 36. The cooler core 17 is disposed on a cooler core flow path 37. The heater core 18 is disposed on a heater core flow path 38.

The first pump flow path 31, the second pump flow path 32, the radiator flow path 33, the device flow path 36, the cooler core flow path 37, and the heater core flow path 38 are connected to a first switching valve 19 and a second switching valve 20.

The first switching valve 19 and the second switching valve 20 are switching parts (i.e., a flow switching part for the heat medium) which switch the flow of the coolant.

The first switching valve 19 is a multiple-port valve having a number of ports (i.e., first switching valve ports) which constitute inlet port and outlet port of the coolant. Specifically, the first switching valve 19 includes a first inlet port 19a and a second inlet port 19b as inlet ports of coolant, and first to third outlet ports 19c to 19e as outlet ports of the coolant.

The second switching valve 20 is a multiple-port valve having a number of ports (i.e., second switching valve ports) which constitute inlet port or outlet port of the coolant. Specifically, the second switching valve 20 includes a first outlet port 20a and a second outlet port 20b as outlet ports of coolant, and first to third inlet ports 20c to 20e as inlet ports of the coolant.

An end of the first pump flow path 31 is connected to the first inlet port 19a of the first switching valve 19. In other words, a coolant outlet side of the coolant cooler 14 is connected to the first inlet port 19a of the first switching valve 19.

An end of the cooler core flow path 37 is connected to the first pump flow path 31 at a portion between the coolant cooler 14 and the first switching valve 19. In other words, a coolant inlet side of the cooler core 17 is connected to the coolant outlet side of the coolant cooler 14.

An end of the second pump flow path 32 is connected to the second inlet port 19b of the first switching valve 19. In other words, a coolant outlet side of the coolant heater 15 is connected to the second inlet port 19b of the first switching valve 19.

An end of the radiator flow path 33 is connected to the first outlet port 19c of the first switching valve 19. In other words, a coolant inlet side of the radiator 13 is connected to the first outlet port 19c of the first switching valve 19.

An end of the device flow path 36 is connected to the second outlet port 19d of the first switching valve 19. In other words, a coolant inlet side of the device 16 is connected to the second outlet port 19d of the first switching valve 19.

An end of the heater core flow path 38 is connected to the third outlet port 19e of the first switching valve 19. In other words, a coolant inlet side of the heater core 18 is connected to the third outlet port 19e of the first switching valve 19.

The other end of the first pump flow path 31 is connected to the first outlet port 20a of the second switching valve 20. In other words, a coolant intake side of the first pump 11 is connected to the first outlet port 20a of the second switching valve 20.

The other end of the second pump flow path 32 is connected to the second outlet port 20b of the second switching valve 20. In other words, a coolant intake side of the second pump 12 is connected to the second outlet port 20b of the second switching valve 20.

The other end of the heater core flow path 38 is connected to the second pump flow path 32 at a portion between the second switching valve 20 and the second pump 12. In other words, a coolant outlet side of the heater core 18 is connected to a coolant intake side of the second pump 12.

The other end of the radiator flow path 33 is connected to the first inlet port 20c of the second switching valve 20. In other words, a coolant outlet side of the radiator 13 is connected to the first inlet port 20c of the second switching valve 20.

The other end of the device flow path 36 is connected to the second inlet port 20d of the second switching valve 20. In other words, a coolant outlet side of the device 16 is connected to the second inlet port 20d of the second switching valve 20.

The other end of the cooler core flow path 37 is connected to the third inlet port 20e of the second switching valve 20. In other words, a coolant outlet side of the cooler core 17 is connected to the third inlet port 20e of the second switching valve 20.

The first switching valve 19 can arbitrarily or selectively switch a communication state between the respective inlet ports 19a, 19b and the respective outlet ports 19c to 19e. The second switching valve 20 can also arbitrarily or selectively switch a communication state between the respective outlet ports 20a, 20b and the respective inlet ports 20c to 20e.

Specifically, the first switching valve 19 sets (i) a state in which the coolant discharged from the first pump 11 flows to the radiator 13, the device 16, and the heater core 18, (ii) a state in which the coolant discharged from the second pump 12 flows to the radiator 13, the device 16, and the heater core 18, or (iii) a state in which the coolant discharged from the first pump 11 and the second pump 12 does not flow to the radiator 13, the device 16, and the heater core 18.

The second switching valve 20 sets (i) a state in which the coolant flows to the first pump 11 from the radiator 13, the device 16, or the cooler core 17, (ii) a state in which the coolant flows to the second pump 12 from the radiator 13, the device 16, or the cooler core 17, or (iii) a state in which the coolant does not flow to the first pump 11 and the second pump 12 from the radiator 13, the device 16, or the cooler core 17.

Examples of structures of the first switching valve 19 and the second switching valve 20 will be described briefly. Each of the first switching valve 19 and the second switching valve 20 includes a case forming an outer shell and a valve body stored in the case. An inlet port and an outlet port for a coolant are formed at predetermined positions of the case, and the communicating state between the inlet port and the outlet port for the coolant is changed by rotating the valve body.

The valve body of the first switching valve 19 and the valve body of the second switching valve 20 are rotated independently by different electric motors. The valve body of the first switching valve 19 and the valve body of the second switching valve 20 may be driven to continuously rotate by a common electric motor.

The first switching valve 19 may include valve bodies. The second switching valve 20 may include valve bodies. The valve body of the first switching valve 19 and the valve body of the second switching valve 20 may be mechanically connected. The valve body of the first switching valve 19 and the valve body of the second switching valve 20 may be integrally formed.

The first pump 11, the second pump 12, the coolant cooler 14, the coolant heater 15, the first switching valve 19, the second switching valve 20, the compressor 23, the expansion valve 24, and the relief valve 25 constitute a refrigeration cycle unit 40.

The refrigeration cycle unit 40 includes a casing (not illustrated) that houses the first pump 11, the second pump 12, the coolant cooler 14, the coolant heater 15, the first switching valve 19, the second switching valve 20, the compressor 23, the expansion valve 24, and the relief valve 25.

Figure 2:
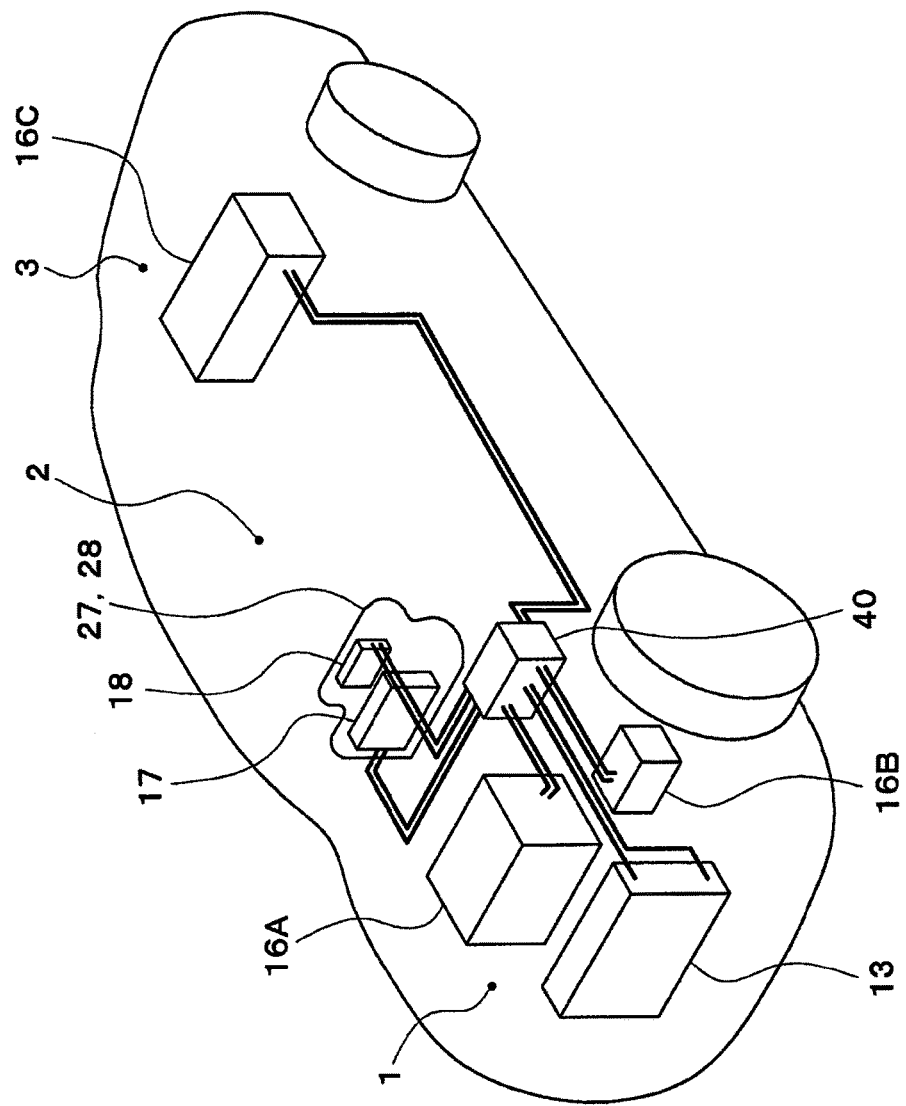
FIG. 2 is a perspective view illustrating a vehicle in which the vehicular heat management system according to the first embodiment is disposed.

As illustrated in FIG. 2, the refrigeration cycle unit 40 is disposed in an engine room 1 at the front portion of the vehicle. The radiator 13 and the exterior blower 21 are disposed in a foremost portion of the vehicle. The cooler core 17 and the heater core 18 housed in the casing 28 of the interior air conditioning unit 27 are disposed inside a dashboard panel (i.e., instrument panel) provided at the foremost portion in a vehicle compartment 2.

The engine room 1 is an engine storage space that houses the engine, and is formed outside the vehicle compartment by a vehicle body member. The engine room 1 is formed on a rear side of the foremost portion of the vehicle and on a front side of a firewall (not illustrated) in the vehicle fore-and-aft direction. The fire wall is a diaphragm that partitions the vehicle compartment 2 and the engine room 1.

The engine room 1 is formed downward of a bonnet hood and upward of a lowest portion of the vehicle body in the vertical direction of the vehicle. The engine room 1 is formed inward of a fender in the lateral direction of the vehicle.

In the example of FIG. 2, an engine 16A, an inverter 16B and a battery 16C are provided as the device 16. The engine 16A and the inverter 16B are disposed inside the engine room 1 of the vehicle. The battery 16C is disposed in a luggage room 3 at a rear portion of the vehicle.

Figure 3:
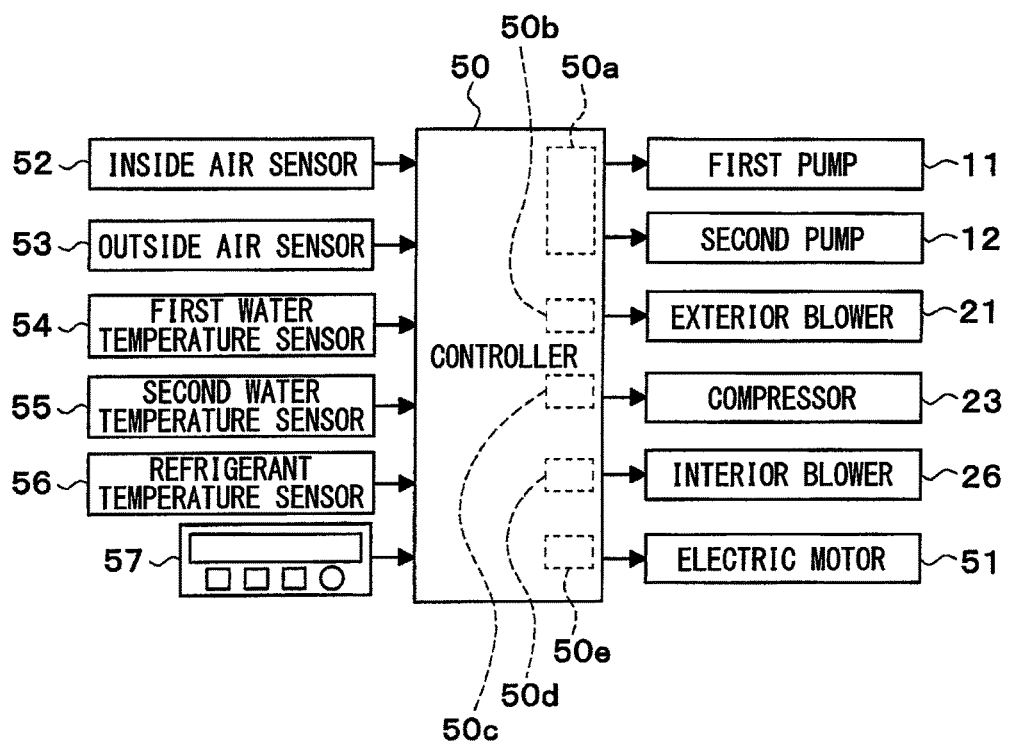
FIG. 3 is a block diagram illustrating an electric control unit of the vehicular heat management system according to the first embodiment.

Subsequently, an electric control unit of the vehicular heat management system 10 will be described with reference to FIG. 3. A controller (i.e., ECU) 50 includes a well-known microcomputer that includes a CPU, a ROM, a RAM, and the like, and a peripheral circuit thereof. The controller performs various computation and processes on the basis of an air-conditioning control program stored in the ROM, and controls operations of the first pump 11, the second pump 12, the exterior blower 21, the compressor 23, the interior blower 26, a switching valve electric motor 51, and the like connected to output side.

The switching valve electric motor 51 is a switching valve drive unit that drives the valve body of the first switching valve 19 and the valve body of the second switching valve 20. In the present embodiment, an electric motor for driving the valve body of the first switching valve 19 and an electric motor for driving the valve body of the second switching valve 20 are separately provided as the switching valve electric motor 51.

The controller 50 is integrally provided with control sections for controlling various types of control target device that are connected to the output side thereof. A configuration (hardware and software) for controlling the operation of each type of the control target device constitutes the control section for controlling the operation of each type of the control target device.

In the present embodiment, a configuration (hardware and software) which controls operations of the first pump 11 and the second pump 12 corresponds to a pump control section 50a. The pump control section 50a is a flow adjustment part that causes a coolant to flow. The pump control section 50a may be independent of the controller 50.

In the present embodiment, a configuration (hardware and software) that controls the operation of the exterior blower 21 corresponds to an exterior blower control section 50b (i.e., air blower control section). The exterior blower control section 50b may be independent of the controller 50.

In the present embodiment, a configuration (hardware and software) that controls the operation of the compressor 23 corresponds to a compressor control section 50c. The compressor control section 50c may be independent of the controller 50.

In the present embodiment, a configuration (hardware and software) that controls the operation of the interior blower 26 corresponds to an interior blower control section 50d (i.e., air-blow control section). The interior blower control section 50d may be independent of the controller 50.

In the present embodiment, a configuration (hardware and software) that controls the operation of the switching valve electric motor 51 corresponds to a switching valve control section 50e. The switching valve control section 50e may be independent of the controller 50.

Detection signals of various sensors such as an inside air sensor 52, an outside air sensor 53, a first water temperature sensor 54, a second water temperature sensor 55, and a refrigerant temperature sensor 56 are input to an input side of the controller 50.

The inside air sensor 52 is a detector (i.e., an inside-air temperature detector) that detects the inside temperature (i.e., a temperature in the vehicle compartment). The outside air sensor 53 is a detector (i.e., an outside-air temperature detector) that detects the outside temperature (i.e., a temperature outside of the vehicle compartment).

The first water temperature sensor 54 is a detector (i.e., first heat medium-temperature detector) that detects the temperature of coolant flowing through the first pump flow path 31 (e.g., the temperature of coolant flowing out of the coolant cooler 14).

The second water temperature sensor 55 is a detector (i.e., a second-heat-medium temperature detector) that detects the temperature of the coolant flowing through the second pump flow path 32 (e.g., the temperature of the coolant flowing out of the coolant heater 15).

The refrigerant temperature sensor 56 is a detector (i.e., refrigerant temperature detector) that detects the temperature (e.g., the temperature of refrigerant discharged from the compressor 23 or the temperature of a coolant flowing out of the coolant cooler 14) of the refrigerant in the refrigeration cycle 22. The refrigerant temperature sensor 56 may be disposed in the heat exchanger which is disposed in the refrigeration cycle 22 as needed.

For example, the inside air temperature, the outside air temperature, the coolant temperature, and the refrigerant temperature, may be estimated on the basis of detection values of various physical quantities.

A refrigerant pressure sensor that detects the pressure (e.g., the pressure of a refrigerant discharged from the compressor 23 or the pressure of a coolant flowing out of the coolant cooler 14) of the refrigerant in the refrigeration cycle 22 may be disposed instead of the refrigerant temperature sensor 56.

An operation signal is input to an input side of the controller 50 from an air-conditioning switch 57. The air-conditioning switch 57 is a switch that switches the air conditioner between ON and OFF, and is disposed near a dashboard panel in the vehicle compartment.

The operation of the aforementioned configuration components will be described below. The controller 50 controls the operations of the first pump 11, the second pump 12, the compressor 23, the switching valve electric motor 51 and the like to switch one of various operating modes to another.

For example, the first pump flow path 31 and at least one of the radiator flow path 33, the device flow path 36, the cooler core flow path 37, and the heater core flow path 38 define a first coolant circuit (i.e., first heat medium circuit). The second pump flow path 32 and at least another one of the radiator flow path 33, the device flow path 36, the cooler core flow path 37, and the heater core flow path 38 define a second coolant circuit (i.e., second heat medium circuit).

Each of the radiator flow path 33, the device flow path 36, the cooler core flow path 37, and the heater core flow path 38 is switched to a case of being connected to the first coolant circuit and a case of being connected to the second coolant circuit depending on the circumstance, so that the radiator 13, the device 16, the cooler core 17, and the heater core 18 can be adjusted to adequate temperatures depending on the circumstance.

In other words, when the coolant cooler 14 and the device 16 are connected to the same cooling circuit, the device 16 can be cooled by the coolant cooled by the coolant cooler 14. When the coolant heater 15 and the device 16 are connected to the same cooling circuit, the device 16 can be heated by the coolant heated by the coolant heater 15.

In the case where the coolant cooler 14 and the cooler core 17 are connected to the same cooling circuit, air to the vehicle compartment is cooled by the cooler core 17, so that the vehicle compartment can be cooled.

In the case where the coolant heater 15 and the heater core 18 are connected to the same cooling circuit, the air to the vehicle compartment is heated by the heater core 18, so that the vehicle compartment can be warmed.

In the case where the coolant cooler 14 and the radiator 13 are connected to the same cooling circuit, a heat pump operation of the refrigeration cycle 22 can be performed. In other words, in the first coolant circuit, since the coolant cooled by the coolant cooler 14 flows in the radiator 13, the coolant absorbs heat from the outside air in the radiator 13. The coolant that has absorbed heat from the outside air in the radiator 13 exchanges heat with the refrigerant in the refrigeration cycle 22 in the coolant cooler 14 to radiate heat. Therefore, in the coolant cooler 14, the refrigerant of the refrigeration cycle 22 absorbs heat from the outside air through the coolant.

The refrigerant that has absorbed heat from the outside air in the coolant cooler 14 exchanges heat with the coolant in the second coolant circuit in the coolant heater 15 to radiate heat. Accordingly, a heat pump operation, in which heat is drawn from the outside air, can be realized.

Figure 4:
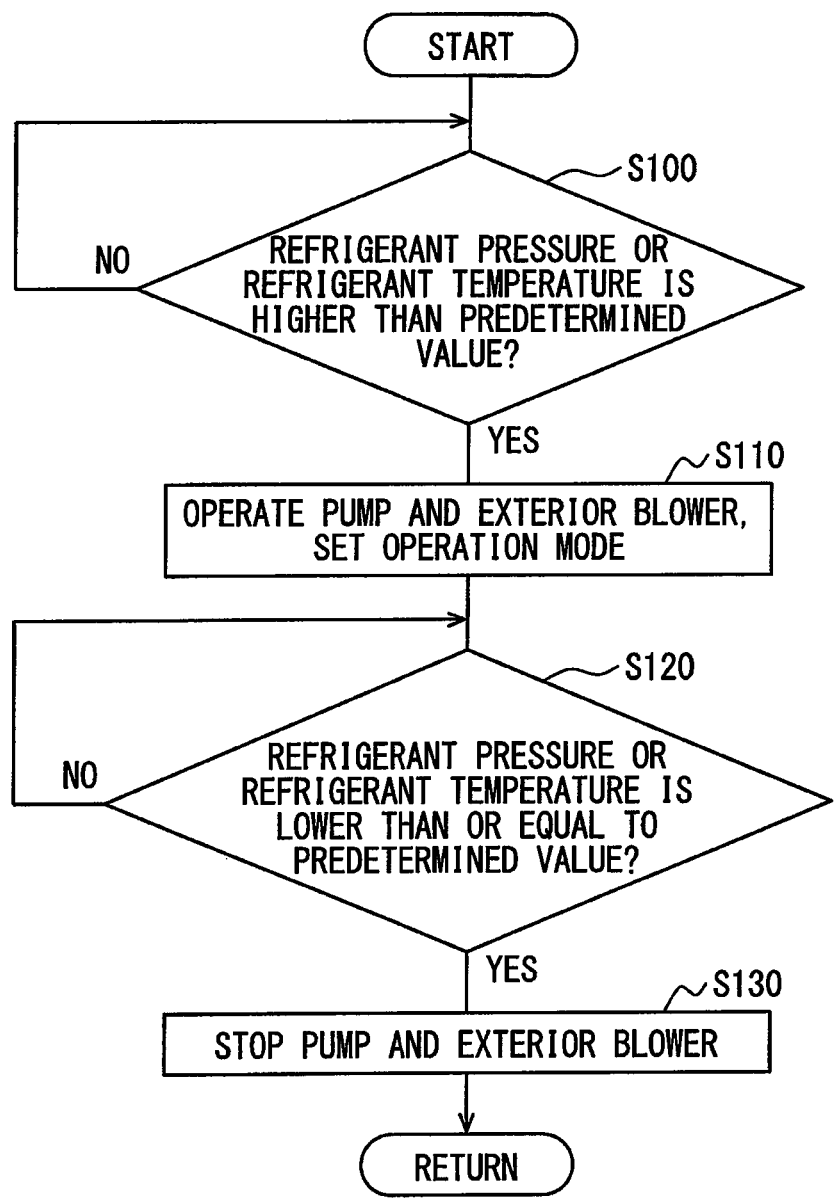
FIG. 4 is a flowchart illustrating a control process to be executed by the controller of the vehicular heat management system according to the first embodiment.

When the compressor 23 is stopped, the controller 50 executes a control process illustrated by a flowchart in FIG. 4. The control process is performed even in the state in which the ignition switch of the vehicle is turned OFF.

At step S100, it is determined that whether a pressure Pc of the refrigerant in the refrigeration cycle 22 is higher than a predetermined value P1 or not. The predetermined value P1 is memorized in the controller 50 in advance. The predetermined value P1 is a value not higher than a valve opening pressure of the relief valve 25.

When the pressure Pc of the refrigerant in the refrigeration cycle 22 is determined not to be higher than the predetermined value P1, the procedure returns to step S100.

When the pressure or the temperature of the refrigeration cycle 22 is determined to be higher than the predetermined value, the procedure advances to step S110.

The first pump 11 and the exterior blower 21 are operated, and the first switching valve 19 and the second switching valve 20 are switched so as to achieve an operating mode illustrated in FIG. 1 at step S110.

Accordingly, since the coolant circulate to the radiator 13 and the coolant cooler 14, the coolant absorbs heat from the refrigerant in the coolant cooler 14, and the coolant radiates heat to the outside air in the radiator 13. Therefore, the refrigerant in the refrigeration cycle 22 is cooled, and the pressure Pc of the refrigerant decreases.

Heat can be naturally radiated from the coolant to the outside air by the radiator 13 without operating the exterior blower 21 at step S110.

At step S120, it is determined whether the pressure Pc of the refrigerant in the refrigeration cycle 22 is lower than or equal to the predetermined value P1. When the pressure Pc of the refrigerant in the refrigeration cycle 22 is determined to be higher than the predetermined value P1, the procedure returns to step S120. On the other hand, when the pressure Pc of the refrigerant in the refrigeration cycle 22 is determined to be lower than or equal to the predetermined value P1, the procedure advances to step S130, and the first pump 11 and the exterior blower 21 are stopped.

Accordingly, even when the compressor 23 is stopped, an increase in pressure of the refrigerant can be restricted by restricting an increase of a temperature of the refrigerant.

For example, since an increase in pressure of the refrigerant can be restricted even in the circumstance in which the temperature in the engine room is increased both when the engine is stopped and when the engine is operated, components of the refrigeration cycle 22 can be protected and the compressor 23 can be operated without problem.

In the present example, when the pressure Pc of the refrigerant in the refrigeration cycle 22 is determined to be lower than or equal to the predetermined value P1 at step S120, step S130, the first pump 11 and the exterior blower 21 are stopped. However, the first pump 11 and the exterior blower 21 may be stopped when an elapsed time that has elapsed since the first pump 11 and the exterior blower 21 are started at step S110 is determined to be longer than or equal to a predetermined time.

Although the first pump 11 is switched between being operated and stopped based on the pressure Pc of the refrigerant in the refrigeration cycle 22 at steps S100 to S130, the first pump 11 may be switched between being operated and stopped based on a temperature Tc of the refrigerant in the refrigeration cycle 22. For example, the first pump 11 may be operated when the temperature Tc of the refrigerant in the refrigeration cycle 22 is determined to be higher than the predetermined value T1, and may be stopped when the temperature Tc of the refrigerant in the refrigeration cycle 22 is determined to be lower than or equal to the predetermined value T1. In this case, the predetermined value T1 is lower than the temperature of the refrigerant corresponding to a valve-opening pressure of the relief valve 25.

The first pump 11 may be stopped when the pressure Pc or the temperature Tc of the refrigerant in the refrigeration cycle 22 is estimated to exceed the predetermined value P1 or T1 even in a case where the pressure Pc or the temperature Tc of the refrigerant in the refrigeration cycle 22 is still lower than the predetermined value P1 or T1.

Figure 5:
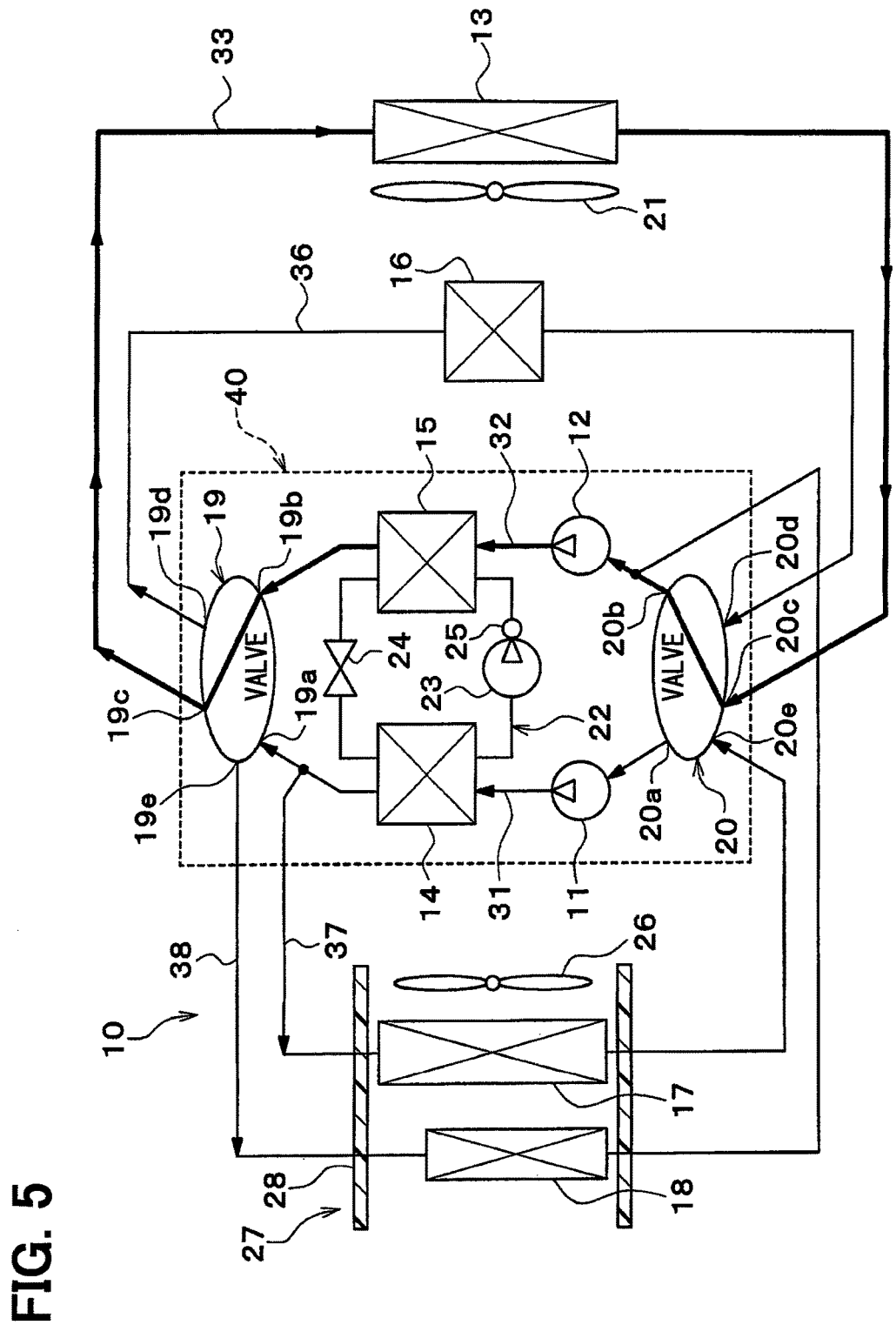
FIG. 5 is a general configuration drawing of the vehicular heat management system according to the first embodiment, illustrating another operating mode.

Although the first switching valve 19 and the second switching valve 20 are switched to operate the first pump 11 so that the operating mode becomes the mode illustrated in FIG. 1 at step S110, the second pump 12 may be operated by switching the first switching valve 19 and the second switching valve 20 so that the operating mode becomes the mode illustrated in FIG. 5.

Accordingly, since the coolant circulates to the radiator 13 and the coolant heater 15, the coolant absorbs heat from the refrigerant in the coolant heater 15, and the coolant radiates heat to the outside air in the radiator 13. Therefore, the refrigerant in the refrigeration cycle 22 is cooled, and the pressure Pc of the refrigerant decreases.

In the present embodiment, when the compressor 23 is stopped, the controller 50 (i.e., a pump control section 50a) operates the first pump 11 to cause the coolant to flow. The coolant of which flow is caused by the first pump 11 functions as a cooling fluid for cooling the refrigerant.

Accordingly, even when the compressor 23 is stopped, the refrigerant can be cooled. Therefore, an excess increase in pressure of the refrigerant is restricted.

Specifically, when the compressor 23 is stopped and when the pressure Pc or the temperature Tc of the refrigerant is determined to be higher than the predetermined value P1 or T1 or is estimated to exceed the predetermined value P1 or T1, the controller 50 (i.e., the pump control section 50a) operates at least one of the first pump 11 and the second pump 12.

Accordingly, a flow of the coolant can be caused when the pressure of the refrigerant is determined to increase or estimated to increase.

In the present embodiment, the first switching valve 19 and the second switching valve 20 switch between a state in which the coolant circulates between the radiator 13 and the coolant heater 15 and a state in which the coolant circulates between the radiator 13 and the coolant cooler 14 are provided.

When the compressor 23 is stopped and when the pressure Pc or the temperature Tc of the refrigerant is determined to be higher than the predetermined value P1 or T1 or is estimated to exceed the predetermined value P1 or T1, the first switching valve 19 and the second switching valve 20 execute an operating pattern that sets a state in which the coolant circulates between the radiator 13 and the coolant cooler 14.

Accordingly, the refrigerant accumulated in the coolant cooler 14 can be cooled to a liquid phase state as much as possible. Therefore, the refrigeration cycle 22 can deliver performance quickly when the compressor 23 is restarted.

In the present embodiment, after the controller 50 (i.e., the pump control section 50a) starts the pump, the controller 50 stops the pump when the pressure Pc or the temperature Tc of the refrigerant becomes lower than or equal to the predetermined value P1 or T1.

Accordingly, the pump is restricted from being operated more than necessary, and hence a consumed power of the pump can be suppressed. The controller 50 (i.e., the pump control section 50a) may stop the pump when the predetermined time elapses since the pump is operated.

In the present embodiment, when the compressor 23 is stopped and when the pressure Pc or the temperature Tc of the refrigerant is determined to be higher than the predetermined value P1 or T1 or is estimated to exceed the predetermined value P1 or T1, the controller 50 (i.e., an exterior blower control section 50b) operates the exterior blower 21.

Accordingly, the refrigerant can be cooled efficiently, so that an excess increase in pressure of the refrigerant is restricted efficiently.

Second Embodiment

Figure 6:
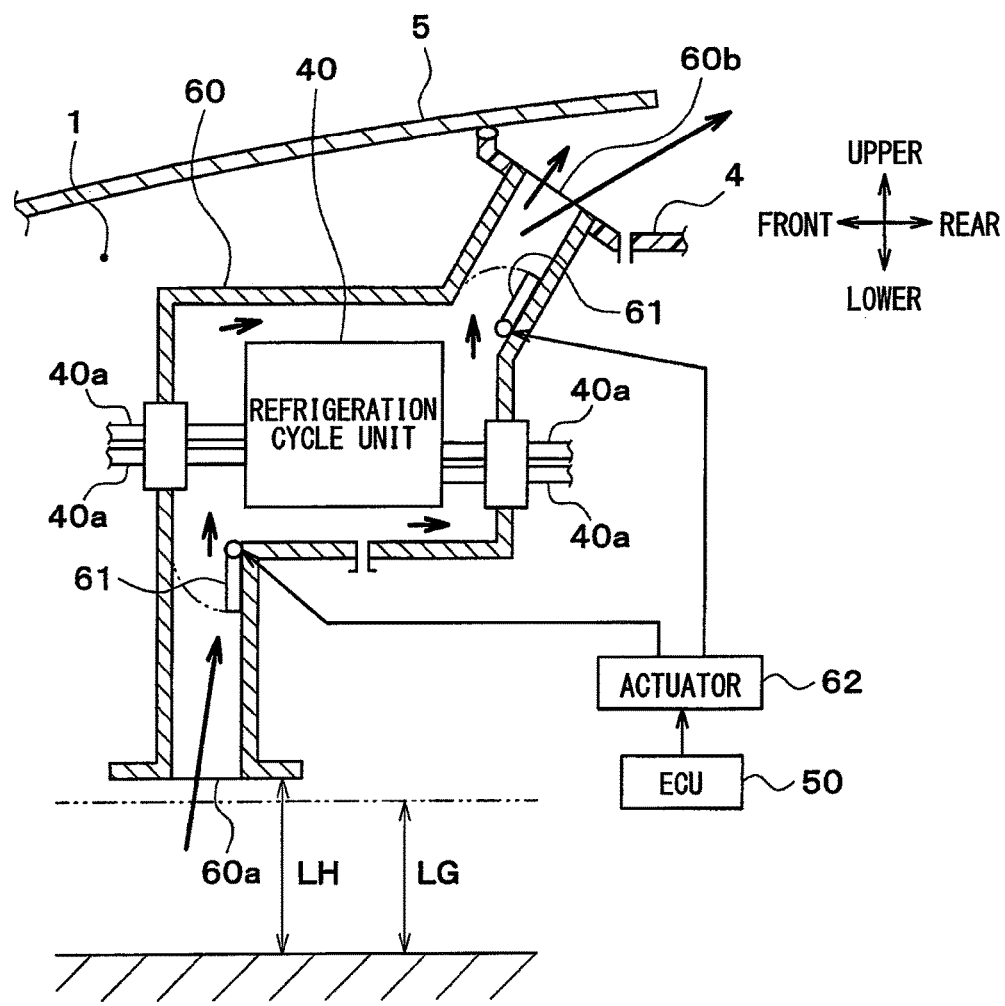
FIG. 6 is a configuration drawing illustrating a principal portion of a vehicular heat management system according to a second embodiment.

In the embodiment described above, a refrigerant is cooled by circulating a coolant. However, in the present embodiment, a refrigerant is cooled by introducing outside air into a refrigeration cycle unit 40 as illustrated in FIG. 6. In FIG. 6, front, rear, upper and lower arrows denote fore, aft, upper and lower directions of a vehicle.

The refrigeration cycle unit 40 is disposed in an air-conducting duct 60. The air-conducting duct 60 is an air-conducting portion that introduces the outside air into the refrigeration cycle unit 40.

The air-conducting duct 60 is an outside-air-passage forming member that forms an outside air passage in which the outside air flows. The air-conducting duct 60 is disposed so as to extend in the vertical direction in an engine room 1.

An opening surface of an opening 60a at a lower end side of the air-conducting duct 60 is disposed at a lower portion of the engine room 1. The opening surface of the opening 60a on the lower end side of the air-conducting duct 60 is disposed upwardly of a lowest portion of a vehicle body. In other words, a vertical distance LH from a ground surface to the opening surface of the opening 60a at the lower end side of the air-conducting duct 60 is larger than a lowest ground height LG of the vehicle.

An opening 60b at an upper end side of the air-conducting duct 60 opens to a cowl 4 of the vehicle. The cowl 4 is a member where wipers (not illustrated) of the vehicle are disposed, and is disposed between a bonnet hood 5 and a front glass (not illustrated) of the vehicle. A coolant pipe 40a of the refrigeration cycle unit 40 penetrates through the air-conducting duct 60.

Two opening-closing doors 61 are disposed in the interior of the air-conducting duct 60. The two opening-closing doors 61 are an opening-closing part for an outside air passage that opens or closes the outside air passage in the air-conducting duct 60.

One of the opening-closing doors 61 is disposed between the refrigeration cycle unit 40 and the opening 60a at the lower end side of the air-conducting duct 60, and the other opening-closing door 61 is disposed between the refrigeration cycle unit 40 and the opening 60b at the upper end side of the air-conducting duct 60.

The two opening-closing doors 61 are driven by an electric actuator 62. The electric actuator 62 is a drive unit that drives the two opening-closing doors 61. The operation of the electric actuator 62 is controlled by a controller 50.

When the vehicle is parked, the controller 50 controls the operation of the electric actuator 62 so that the two opening-closing doors 61 open the outside air passage in the air-conducting duct 60 as illustrated in FIG. 6.

In this configuration, the outside air in the outside air passage in the air-conducting duct 60 is heated by the refrigeration cycle unit 40 and a natural convection is generated. The natural convection generates an outside air flow in the outside air passage in the air-conducting duct 60 as indicated by an arrow in FIG. 6, and hence the outside air can be introduced into the refrigeration cycle unit 40 to cool the refrigerant in the refrigeration cycle unit 40.

Figure 7:
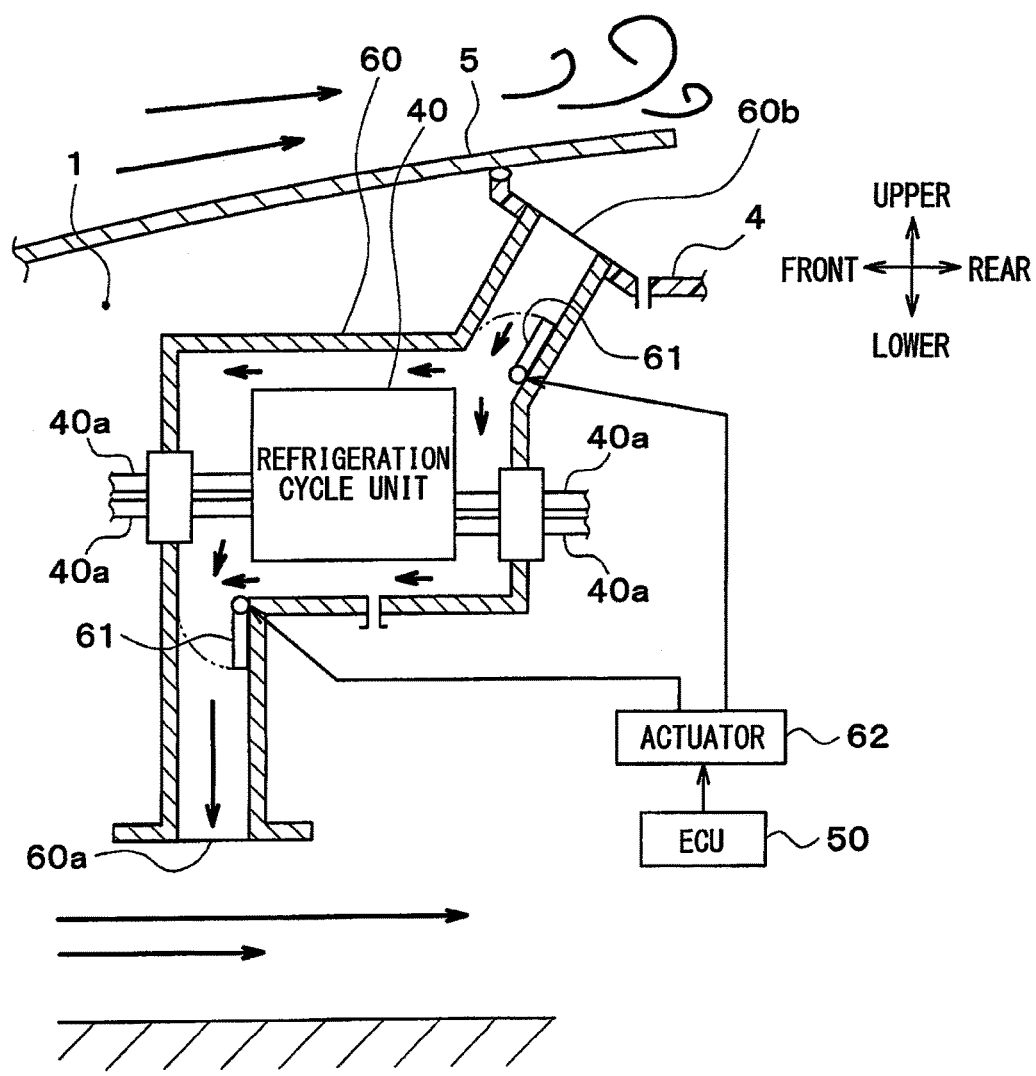
FIG. 7 is a configuration drawing illustrating a principal portion of the vehicular heat management system according to the second embodiment, illustrating a state in which a vehicle is traveling.

When the vehicle is traveling, the controller 50 controls the operation of the electric actuator 62 so that the two opening-closing doors 61 open the outside air passage in the air-conducting duct 60 as illustrated in FIG. 7.

In this configuration, a flow rate of traveling wind at an opening 60a at the lower end side of the air-conducting duct 60 is higher than the opening 60b at the upper end side of the air-conducting duct 60, and hence a negative pressure is increased. A difference in negative pressure generates the outside air flow in the outside air passage in the air-conducting duct 60 as indicated by an arrow in FIG. 7, and hence the outside air can be introduced into the refrigeration cycle unit 40 to cool the refrigerant in the refrigeration cycle unit 40.

Figure 8:
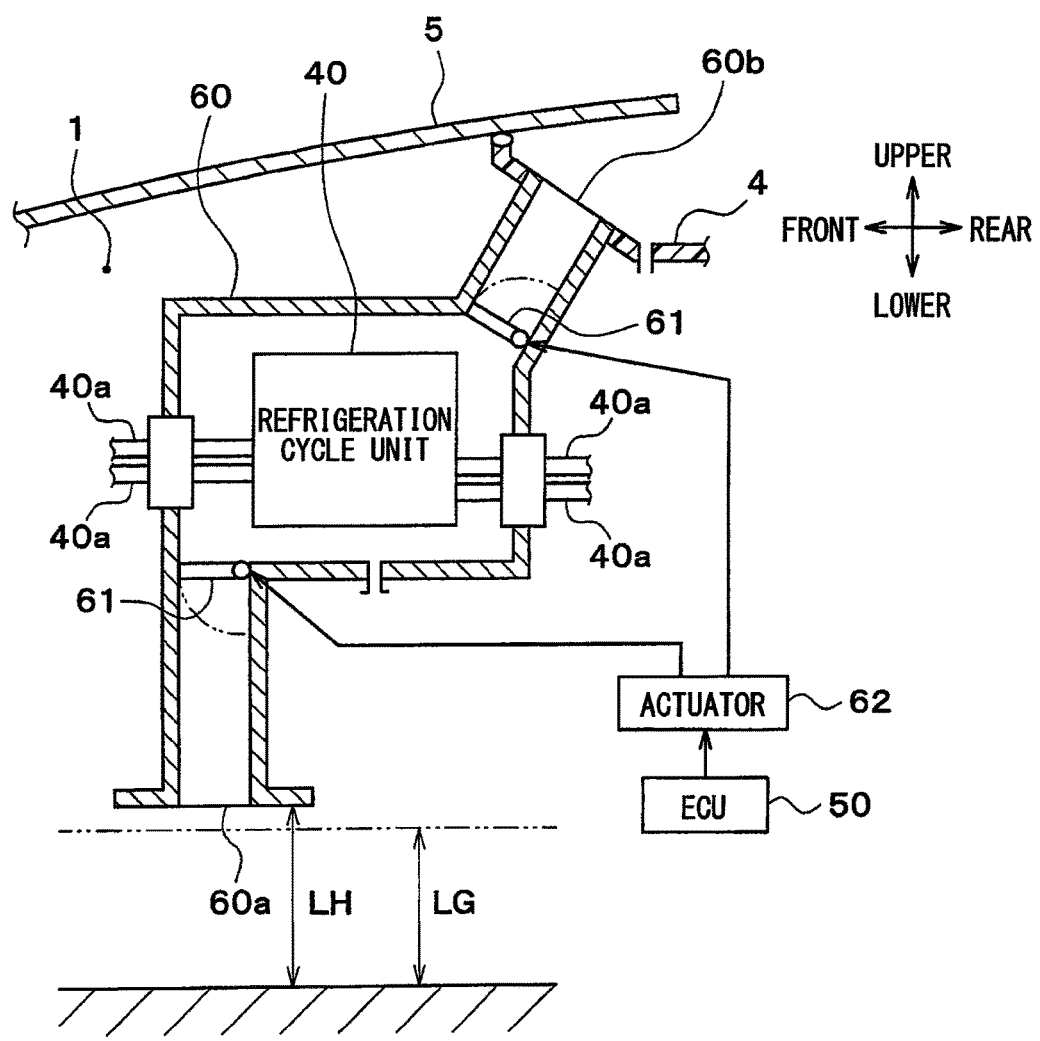
FIG. 8 is a configuration drawing illustrating a principal portion of the vehicular heat management system according to the second embodiment, illustrating a state in which an opening-closing door is closed.

When the compressor 23 is in operation, the controller 50 controls the operation of the electric actuator 62 so that the two opening-closing doors 61 close the outside air passage in the air-conducting duct 60 as illustrated in FIG. 8.

In this configuration, since the outside air flow is not generated in the outside air passage in the air-conducting duct 60, air in the refrigeration cycle unit 40 is heated by waste heat of the compressor 23, the first pump 11 and the second pump 12 or the like, and heat of the heated air is absorbed by the refrigerant flowing in the coolant cooler 14. Therefore, waste heat of the compressor 23, the first pump 11, and the second pump 12 can be used for the heating operation.

In the present embodiment, since the air-conducting duct 60 can pass the outside air, the refrigerant can be cooled by causing the outside air to flow even when the compressor 23 is stopped. Therefore, an excess increase in pressure of the refrigerant is restricted.

In the present embodiment, the air-conducting duct 60 includes at least the two openings 60a, 60b, and the opening surfaces of the two openings 60a, 60b are arranged at different levels from each other in the vertical direction of the vehicle. In this configuration, since a flow of the outside air can be caused by using the natural convection, a motive power for blowing the outside air can be unnecessary or reduced.

In the present embodiment, the two openings 60a, 60b of the air-conducting duct 60 are configured such that the pressure at one opening 60a of the two openings is lower than that at the other opening 60b due to the traveling wind of the vehicle when the vehicle is traveling.

In this configuration, since a flow of the outside air can be caused by using a decrease of the pressure that is caused by the traveling wind, a motive power for blowing the outside air can be unnecessary or reduced.

In the present embodiment, since the opening-closing doors 61 opening or closing the outside air passage is disposed in the air-conducting duct 60, a state in which a flow of the outside air is not caused is set. Therefore, the state can be switched between the state of cooling the refrigerant and the state of not cooling the refrigerant.

Third Embodiment

Figure 9:
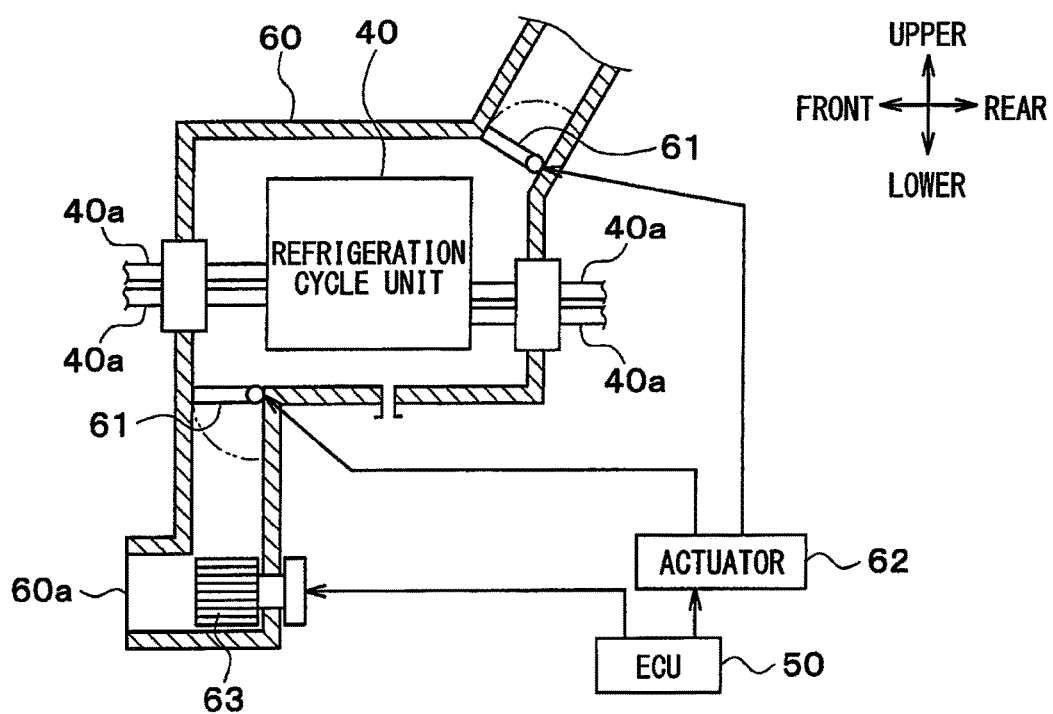
FIG. 9 is a configuration drawing illustrating a principal portion of a vehicular heat management system according to a third embodiment.

In the present embodiment, as illustrated in FIG. 9, a blower 63 is disposed in the outside air passage within an air-conducting duct 60, which is different from the above-described second embodiment. The blower 63 is an electric blower, an operation of which is controlled by a controller 50.

In this configuration, the controller 50 controls the operation of an electric actuator 62 so that two opening-closing doors 61 open the outside air passage within the air-conducting duct 60 and operate the blower 63 to generate an outside air flow in the outside air passage within the air-conducting duct 60. Therefore, a refrigerant within a refrigeration cycle unit 40 can be cooled by introducing the outside air into the refrigeration cycle unit 40.

Fourth Embodiment

In the present embodiment, a refrigerant within a refrigeration cycle unit 40 is cooled by using a convection of the refrigerant.

Figure 10:
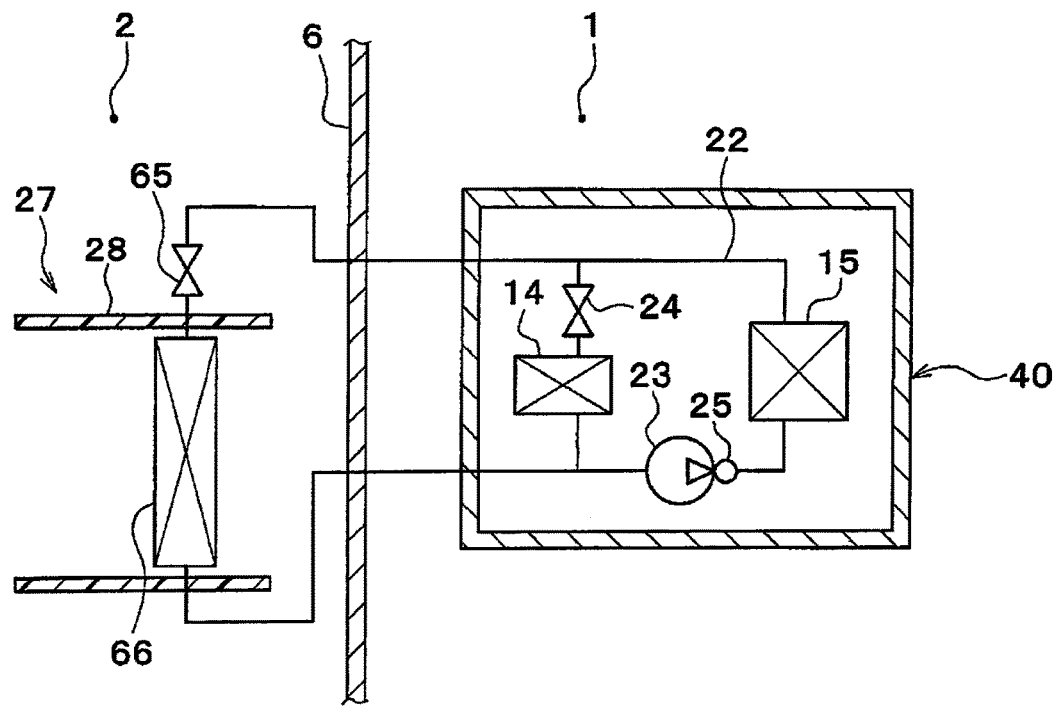
FIG. 10 is a configuration drawing illustrating a principal portion of a vehicular heat management system according to a fourth embodiment.

As illustrated in FIG. 10, a refrigeration cycle 22 includes a second expansion valve 65 and a second evaporator 66. In the viewpoint of a refrigerant flow of the refrigeration cycle 22, the second expansion valve 65 and the second evaporator 66 are disposed in parallel with an expansion valve 24 and a coolant cooler 14.

The second expansion valve 65 is a decompression part for decompressing and expanding a liquid-phase refrigerant flowing out of the coolant heater 15. The second evaporator 66 is an air-cooling heat exchanger that cools air blown into the vehicle compartment by a heat exchange between the low-pressure refrigerant decompressed and expanded by the second expansion valve 65 and air blown into the vehicle compartment. The second evaporator 66 is a refrigerant-flow-path forming member that forms a flow path in which the refrigerant flows.

The second evaporator 66 is disposed in a casing 28 of an interior air conditioning unit 27. Therefore, the second evaporator 66 is disposed within a vehicle compartment 2 partitioned from an engine room 1 by a fire wall 6.

When the compressor 23 is stopped, and when the engine room 1 is heated to a high temperature and hence the refrigerant in the refrigeration cycle unit 40 is heated to a high temperature, a temperature environment in the vehicle compartment 2 in which the second evaporator 66 is disposed is lower than the engine room 1 in which the refrigeration cycle unit 40 is disposed. Therefore, the refrigerant circulates between the refrigeration cycle unit 40 and the second evaporator 66 in a natural convection. At this time, the second evaporator 66 radiates heat of the refrigerant to the air in the vehicle compartment. Therefore, the refrigerant in the refrigeration cycle unit 40 can be cooled.

In the present embodiment, the second evaporator 66 is disposed in a low-temperature area in which air temperature is lower than an area in which the refrigeration cycle unit 40 is disposed. Therefore, when the compressor 23 is stopped, the second evaporator 66 can cool the refrigerant by circulating the refrigerant in a natural convection. Therefore, an excess increase in pressure of the refrigerant is restricted.

Fifth Embodiment

Figure 11:
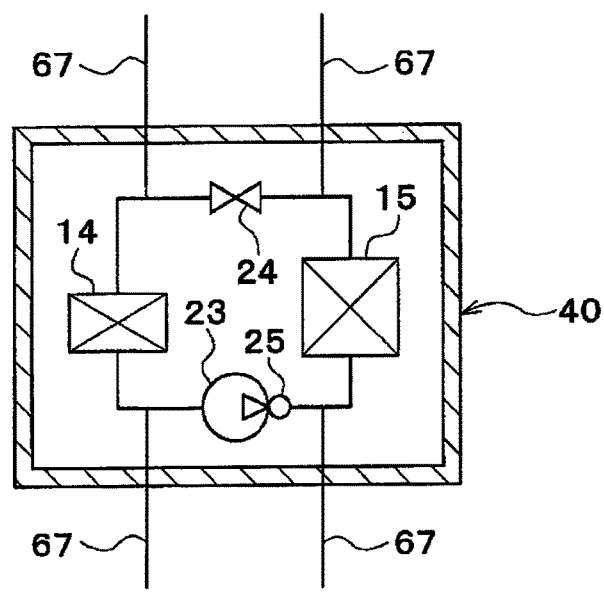
FIG. 11 is a configuration drawing illustrating a principal portion of a vehicular heat management system according to a fifth embodiment.

In the above-described fourth embodiment, a second evaporator 66 radiates heat of a refrigerant. In contrast, in the present embodiment, a refrigerant pipe 67 that constitutes a refrigeration cycle 22 radiates heat of the refrigerant as illustrated in FIG. 11.

The refrigerant pipe 67 is a refrigerant-flow-path forming member that forms a flow path in which the refrigerant flows, and is branched from a refrigerant circulating flow path in the refrigeration cycle 22. The refrigerant circulating flow path is a flow path including a compressor 23, a coolant heater 15, an expansion valve 24, and a coolant cooler 14.

For example, the refrigerant pipe 67 is branched from between the compressor 23 and the coolant heater 15. The refrigerant pipe 67 may be branched from between the coolant heater 15 and the expansion valve 24. The refrigerant pipe 67 may be branched from between the expansion valve 24 and the coolant cooler 14. The refrigerant pipe 67 may be branched from between the coolant cooler 14 and the compressor 23.

The refrigerant pipe 67 extends to a low-temperature area in which an air temperature is lower than that in an area where the refrigeration cycle unit 40 is disposed (e.g., a lower portion of an engine room 1).

The refrigerant flows back and force in the refrigerant pipe 67, and the refrigerant radiates heat to an air in the vehicle compartment in the refrigerant pipe 67 in a natural convection. Therefore, the refrigerant in the refrigeration cycle unit 40 can be cooled.

In the present example, the refrigerant pipe 67 branched from the refrigerant circulating flow path extends to the low-temperature area. However, the same advantageous effects may be achieved even when the refrigerant circulating flow path extends to the low-temperature area. The same advantageous effects are achieved even though at least one of a compressor 23, a coolant heater 15, an expansion valve 24, and a coolant cooler 14 is disposed in the low-temperature area.

Sixth Embodiment

In the above-described first embodiment, when the compressor 23 is stopped and when the pressure Pc or the temperature Tc of a refrigerant is determined to be higher than the predetermined value P1 or T1 or is estimated to exceed predetermined value P1 or T1, a pump 11 and an exterior blower 21 are operated. In the present embodiment, when the compressor 23 is stopped and when the pressure Pc or the temperature Tc of the refrigerant is determined to be higher than the predetermined value P1 or T1 or is estimated to exceed the predetermined value P1 or T1, the compressor 23 is operated in addition to a pump 12 and the exterior blower 21.

Figure 12:
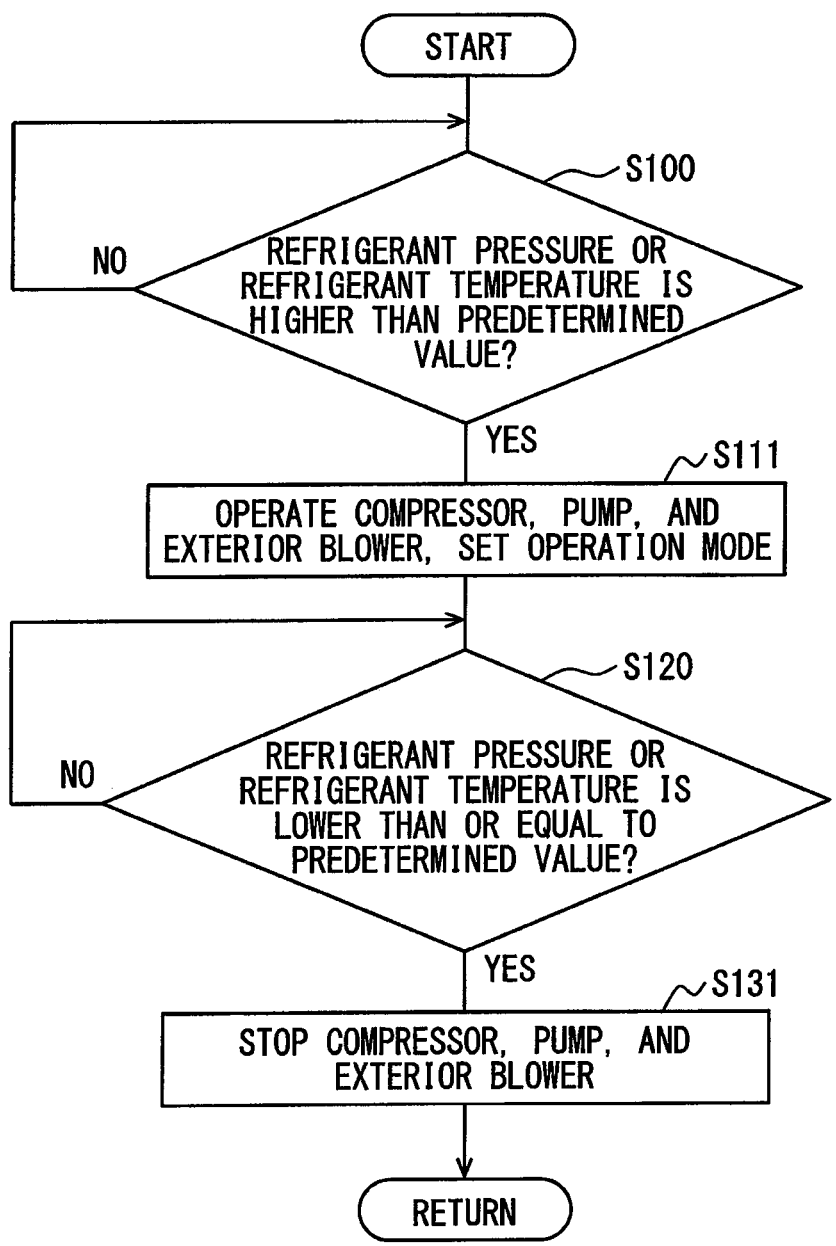
FIG. 12 is a flowchart illustrating a control process to be executed by a controller of a vehicular heat management system according to a sixth embodiment.

Specifically, when the compressor 23 is stopped, the controller 50 executes a control process illustrated by a flowchart in FIG. 12. The control process is performed even in the state in which the ignition switch of the vehicle is turned OFF.

In the flowchart in FIG. 12, steps S110, S130 in the flowchart illustrated in FIG. 4 described in conjunction with the first embodiment described above are changed to steps S111 and S131.

Figure 13:
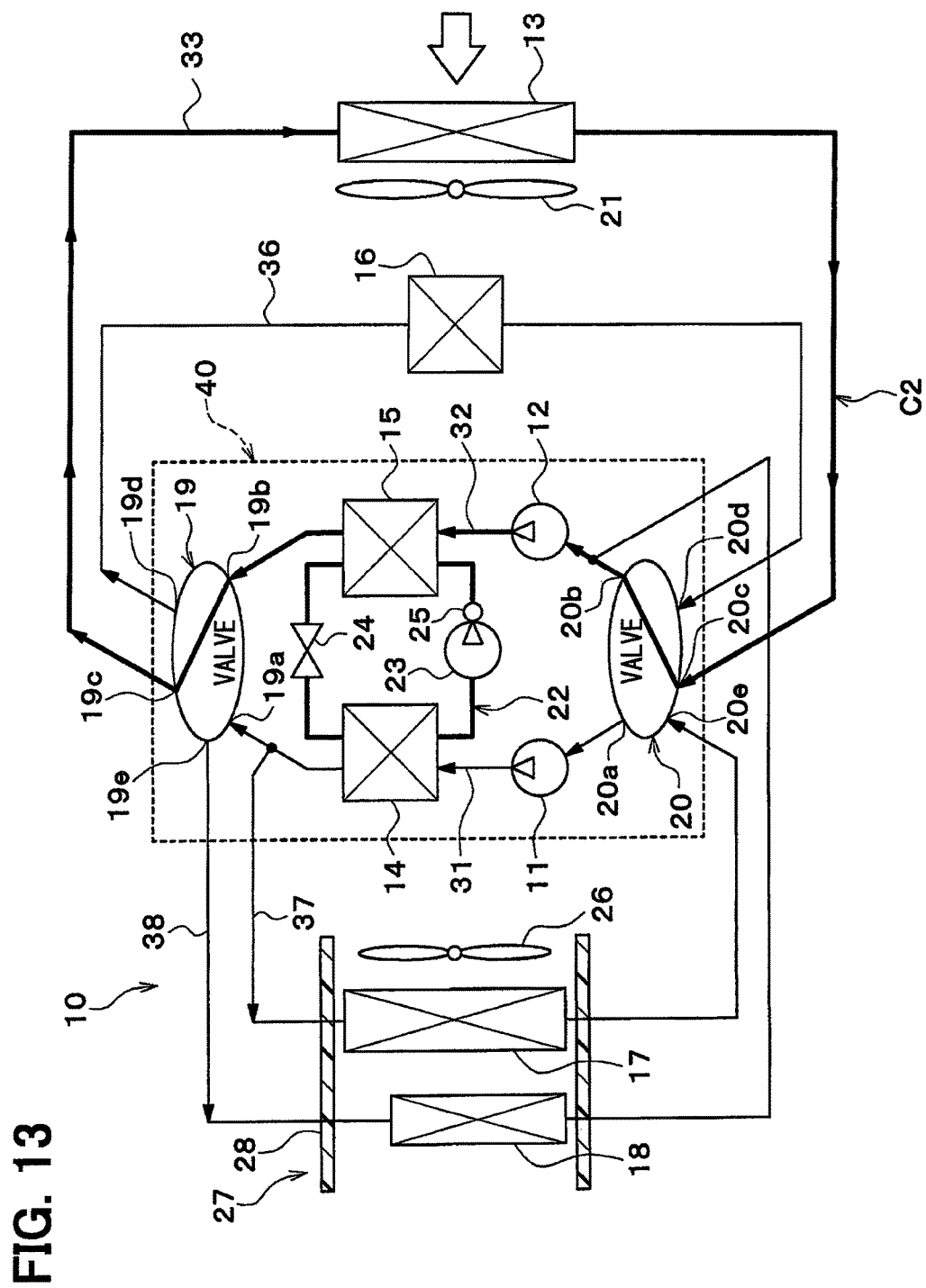
FIG. 13 is a general configuration drawing illustrating the vehicular heat management system according to the sixth embodiment.

When the pressure Pc or the temperature Tc of the refrigerant in a refrigeration cycle 22 is determined to be higher than the predetermined value P1 or T1 at step S100, the procedure advances to step S111, and a first switching valve 19 and a second switching valve 20 are switched so as to become an operating mode illustrated in FIG. 13, and the compressor 23, the second pump 12, and the exterior blower 21 are operated.

In the operating mode illustrated in FIG. 13, a second coolant circuit C2 having a radiator 13 and a coolant heater 15 are formed.

Accordingly, since a coolant circulates to the radiator 13 and the coolant heater 15 even when the compressor 23 is stopped, the coolant absorbs heat from the refrigerant in the coolant heater 15, and the coolant radiates heat to an outside air in the radiator 13. Therefore, the refrigerant in the refrigeration cycle 22 is cooled, and the pressure Pc of the refrigerant decreases.

In addition, since the refrigerant circulates in the refrigeration cycle 22, cold heat is accumulated in the coolant cooler 14. Therefore, as compared with the above-described first embodiment, a temperature increase of the refrigerant after the compressor 23 is stopped is further restricted, and the pressure increase of the refrigerant is further restricted.

When the pressure Pc or the temperature Tc of the refrigerant in the refrigeration cycle 22 is determined to be lower than or equal to a second predetermined value P2 or T2 at step S120, the procedure advances to step S131, and the compressor 23, the second pump 12, and the exterior blower 21 are stopped. The second predetermined value P2 or T2 is memorized in the controller 50 in advance. The second predetermined value P2 or T2 may be the same value as the predetermined value P1 or T1.

In the present embodiment, when the compressor 23 is stopped and when the pressure Pc or the temperature Tc of the refrigerant is determined to be higher than the predetermined value P1 or T1 or is estimated to exceed the predetermined value P1 or T1, the controller 50 (specifically, a pump control section 50a, an exterior blower control section 50b, a compressor control section 50c) operates the compressor 23, the pump 12 and the exterior blower 21.

In this configuration, when the pressure of the refrigerant is determined to increase or is estimated to increase after the compressor 23 is stopped, a flow of the coolant can be caused, outside air can be blown to the radiator 13, and in addition, the refrigerant in the refrigeration cycle 22 can be circulated. Therefore, the refrigerant can be cooled reliably and thus an excess increase in pressure of the refrigerant is reliably restricted.

In the present embodiment, when the pressure Pc or the temperature Tc of the refrigerant becomes lower than or equal to the second predetermined value P2 or T2, the controller 50 (specifically, the pump control section 50a, the exterior blower control section 50b, the compressor control section 50c) stops the compressor 23, the pump 12, and the outside blower 21 after operating the compressor 23, the pumps 11, 12 and the outside blower 21.

Accordingly, since the compressor 23, the pump 12 and the exterior blower 21 are restricted from being operated more than necessary, a consumed power of the compressor 23, the pump 12 and the exterior blower 21 can be restricted.

When the predetermined time elapses after starting the compressor 23, the pump 12, and the exterior blower 21, the controller 50 (specifically, the pump control section 50a, the exterior blower control section 50b, the compressor control section 50c) may stop the compressor 23, the pump 12 and the exterior blower 21.

Seventh Embodiment

Figure 14:
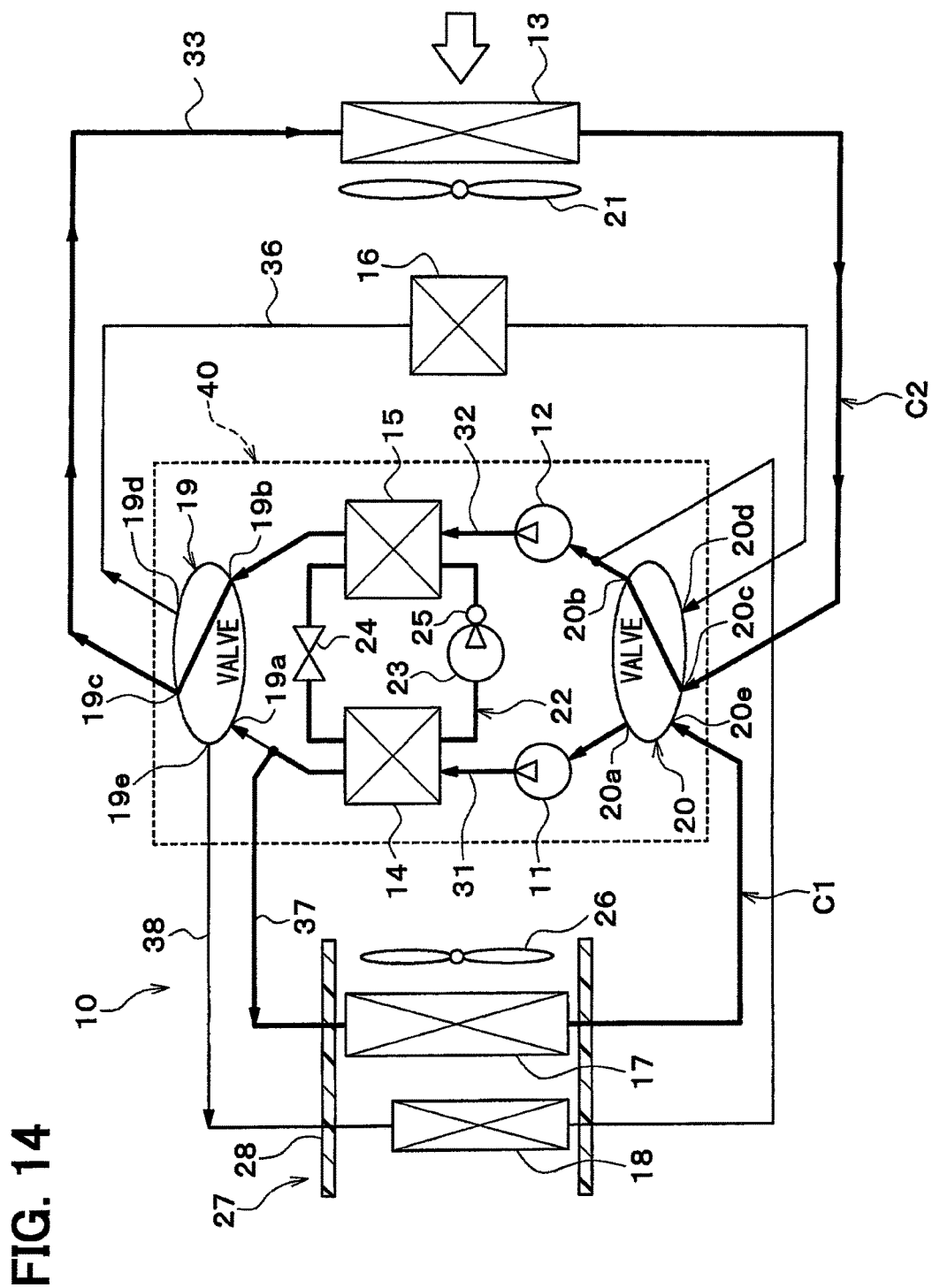
FIG. 14 is a general configuration drawing illustrating a vehicular heat management system according to a seventh embodiment.

In the sixth embodiment described above, a compressor 23, a second pump 12 and an exterior blower 21 are operated when the compressor 23 is stopped and when the pressure Pc or the temperature Tc of a refrigerant is determined to be higher than the predetermined value P1 or T1 or is estimated to exceed the predetermined value P1 or T1. However, in the present embodiment, a first pump 11 is operated in addition to the compressor 23, the second pump 12, and the exterior blower 21 as illustrated in FIG. 14, when the compressor 23 is stopped and when the pressure Pc or the temperature Tc of the refrigerant is determined to be higher than the predetermined value P1 or T1 or is estimated to exceed the predetermined value P1 or T1.

Accordingly, since the first pump 11 are operated, a coolant cooled in a coolant cooler 14 circulates in a first coolant circuit C1 having a cooler core 17. Therefore, since cold can be accumulated in the entire first coolant circuit C1, compared with the above-described sixth embodiment, a temperature increase of the refrigerant after the compressor 23 is stopped is further restricted, so that a pressure increase of the refrigerant is further restricted.

In the present embodiment, the compressor 23, the first pump 11, the second pump 12, and the outside blower 21 are stopped when the pressure Pc or the temperature Tc of the refrigerant becomes lower than or equal to the second predetermined value P2 or T2 after operating the compressor 23, the first pump 11, the second pump 12, and the exterior blower 21.

Accordingly, since the compressor 23, the first pump 11, the second pump 12 and the exterior blower 21 are restricted from being operated more than necessary, a consumed power of the compressor 23, the first pump 11, the second pump 12 and the exterior blower 21 can be restricted.

In the present embodiment, when the compressor 23 is stopped and when the pressure Pc or the temperature Tc of the refrigerant is determined to be higher than the predetermined value P1 or T1 or is estimated to exceed the predetermined value P1 or T1, both of the first pump 11 and the second pump 12 are operated. However, the second pump 12 may not be operated while the first pump 11 is operated.

In this configuration, since the coolant circulates in the first coolant circuit having the coolant cooler 14, a temperature increase of the refrigerant is restricted and a pressure increase of the refrigerant is restricted.

Eighth Embodiment

In the above-described sixth embodiment, when the pressure Pc or the temperature Tc of a refrigerant in the refrigeration cycle 22 is determined to be lower than or equal to the second predetermined value P2 or T2, a compressor 23, a second pump 12, and an exterior blower 21 are stopped. In the present embodiment, when a temperature of a coolant is determined to be lower than or equal to a predetermined coolant-temperature value T3 as illustrated in FIG. 15, the compressor 23, the second pump 12, and the exterior blower 21 are stopped.

Figure 15:
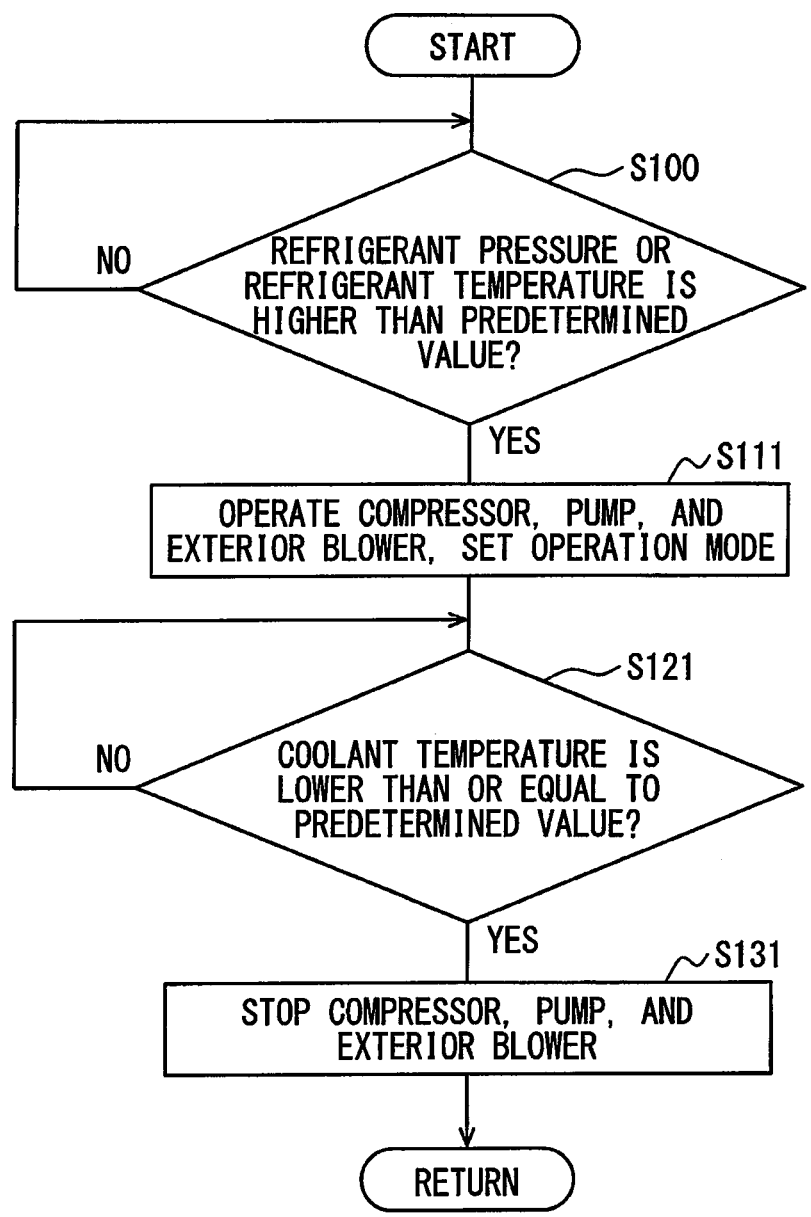
FIG. 15 is a flowchart illustrating a control process to be executed by a controller of a vehicular heat management system according to an eighth embodiment.
Figure 16:
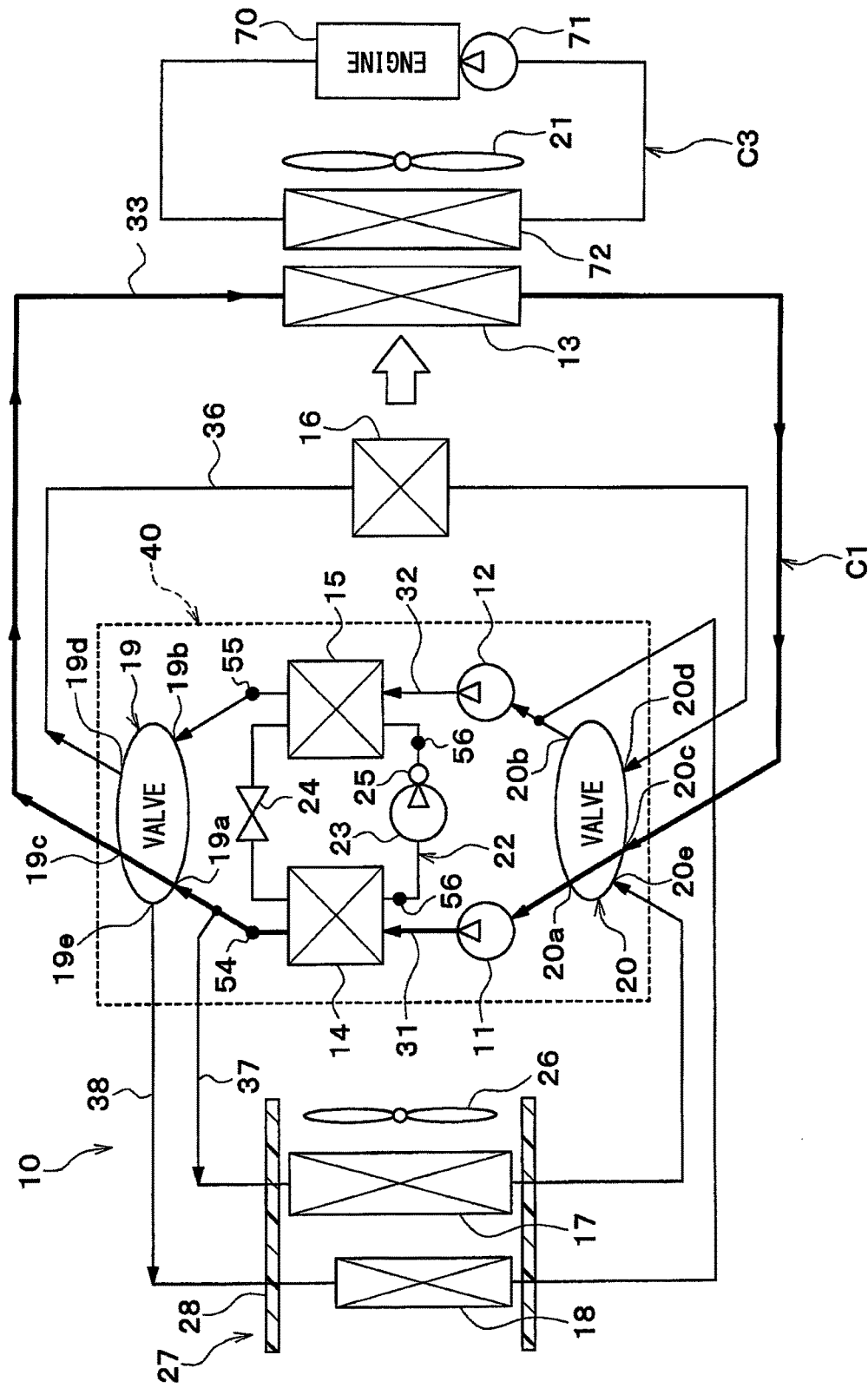
FIG. 16 is a general configuration drawing illustrating a vehicular heat management system according to a ninth embodiment.

Specifically, when the compressor 23 is stopped, a controller 50 executes a control process illustrated by a flowchart in FIG. 15. The control process is performed even in the state in which the ignition switch of the vehicle is turned OFF.

In the flowchart in FIG. 15, step S120 in the flowchart illustrated in FIG. 12 described in conjunction with the sixth embodiment described above is changed to step S121.

At step S121, it is determined whether a temperature Tw of the coolant circulated by a pump is lower than or equal to the predetermined coolant-temperature value T3 (i.e., a predetermined heat-medium-temperature value). The predetermined coolant-temperature value T3 is memorized in the controller 50 in advance.

When the temperature Tw of the coolant is determined not to be lower than or equal to the predetermined coolant-temperature value T3, the procedure returns to step S120. In contrast, when the temperature Tw of the coolant is determined to be lower than or equal to the predetermined coolant-temperature value T3, the procedure advances to step S131, and the compressor 23, the second pump 12, and the exterior blower 21 are stopped.

The temperature Tw of the coolant here has a relative relationship with respect to the temperature Tc and the pressure Pc of the refrigerant in the refrigeration cycle 22. Specifically, the higher the temperature Tw of the coolant, the higher the temperature Tc and the pressure Pc of the refrigerant in the refrigeration cycle 22.

In the present embodiment, when the temperature Tw of the coolant is lower than or equal to the predetermined coolant-temperature value T3, it is estimated that the temperature Tc of the refrigerant in the refrigeration cycle 22 is lower than or equal to the above-described second predetermined value T2. When the temperature Tw of the coolant is not lower than or equal to the predetermined coolant-temperature value T3, it is estimated that the temperature Tc of the refrigerant in the refrigeration cycle 22 is not lower than or equal to the above-described second predetermined value T2.

In the same manner, when the temperature Tw of the coolant is lower than or equal to the predetermined coolant-temperature value T3, it is estimated that the pressure Pc of the refrigerant in the refrigeration cycle 22 is lower than or equal to the second predetermined value P2. When the temperature Tw of the coolant is not lower than or equal to the predetermined coolant-temperature value T3, it is estimated that the pressure Pc of the refrigerant in the refrigeration cycle 22 is not lower than or equal to the second predetermined value P2.

Therefore, in the present embodiment, the same operation and advantages as those in the above-described sixth embodiment can be obtained.

In the present embodiment, the controller 50 (specifically, a pump control section 50a, an exterior blower control section 50b, a compressor control section 50c) stops the compressor 23, the pump 12 and the exterior blower 21 when the temperature Tw of the coolant becomes lower than or equal to the predetermined coolant-temperature value T3 after the compressor 23, the pump 12, and the exterior blower 21 are operated.

Accordingly, since the compressor 23, the pump 12 and the exterior blower 21 are restricted from being operated more than necessary, a consumed power of the compressor 23, the pump 12 and the exterior blower 21 can be restricted.

At step S111 of the present embodiment, a first pump 11 may be operated in addition to the compressor 23, the second pump 12, and the exterior blower 21. In addition, at step S131, the first pump 11 may be also stopped in addition to the compressor 23, the second pump 12, and the exterior blower 21.

Ninth Embodiment

In the above-described embodiment, when a compressor 23 is stopped, a pressure increase of a refrigerant is restricted by cooling a coolant in a coolant circuit. In the present embodiment, when the compressor 23 is stopped, a pressure increase of the refrigerant is restricted by radiating heat of the coolant in an engine cooling circuit C3.

The engine cooling circuit C3 is a coolant circuit that causes an engine coolant (i.e., an internal-combustion-engine cooling medium) to flow to an engine 70 (i.e., an internal combustion engine), and that includes an engine pump 71 and an engine radiator 72.

The engine pump 71 is a pump that causes the engine coolant to circulate in the engine cooling circuit C3. The engine radiator 72 is a heat exchanger (i.e., an internal-combustion-engine cooling heat exchanger) that cools an engine coolant by heat exchange between the engine coolant and an outside air. The engine radiator 72 functions as a radiator that radiates heat of the engine coolant to the outside air. The outside air is blown by an exterior blower 21 to the engine radiator 72.

Figure 17:
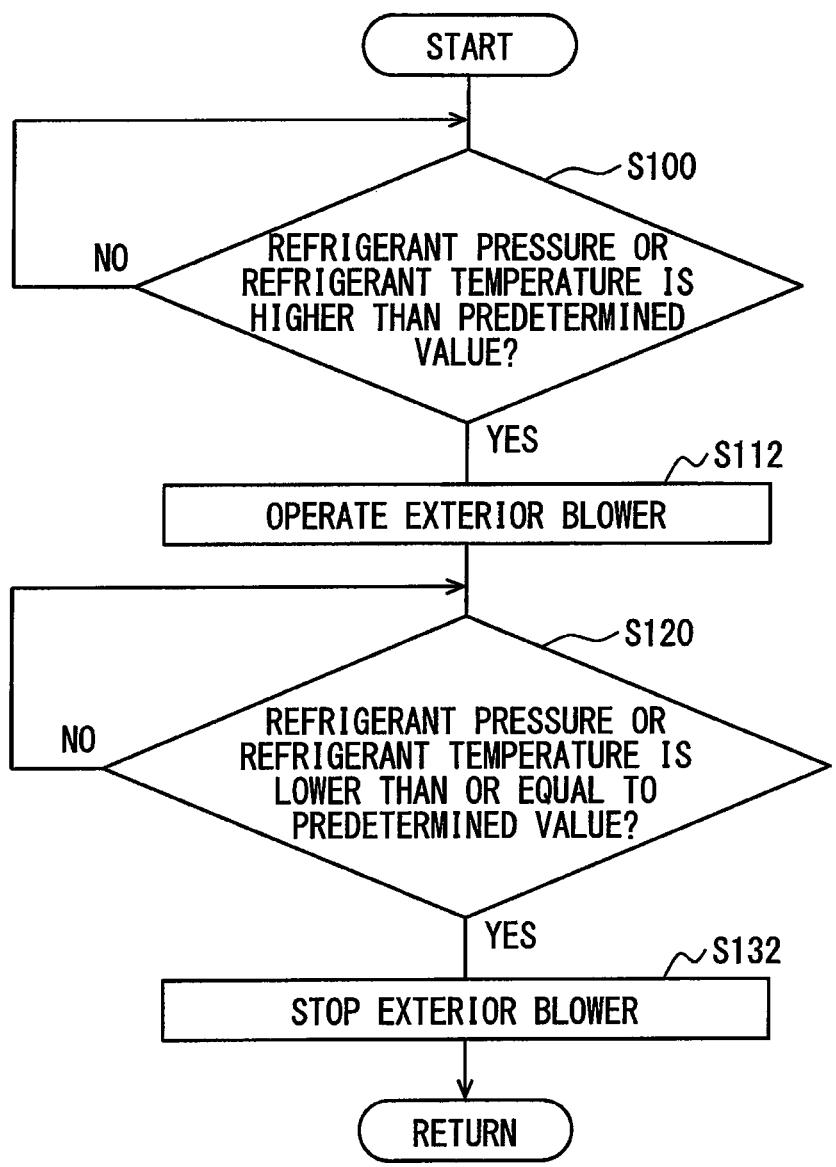
FIG. 17 is a flowchart illustrating a control process to be executed by a controller of the vehicular heat management system according to the ninth embodiment.

In the flowchart in FIG. 17, steps S110, S130 in the flowchart illustrated in FIG. 4 described in conjunction with the first embodiment described above are changed to steps S112, S132.

When the pressure Pc or the temperature Tc of the refrigerant in a refrigeration cycle 22 is determined to be higher than the predetermined value P1 or T1 at step S100, the procedure advances to step S112, and an exterior blower 21 is operated.

Accordingly, the engine coolant radiates heat to the outside air and is cooled in the engine radiator 72, and hence a temperature increase in the engine room due to residual heat of the engine 70 is restricted. Therefore, since an increase in an atmosphere temperature in the refrigeration cycle 22 is restricted, a temperature increase of the refrigerant is restricted and a pressure increase of the refrigerant is restricted.

When the pressure Pc or the temperature Tc of the refrigerant in the refrigeration cycle 22 is determined to be lower than or equal to the second predetermined value P2 or T2 at step S120, the procedure advances to step S132, and the exterior blower 21 is stopped.

The vehicular air conditioning device of the present embodiment includes an engine radiator 72 that exchanges heat between the engine coolant and air, and the exterior blower 21 that blows air to the engine radiator 72. When the pressure Pc or the temperature Tc of the refrigerant is determined to be higher than the predetermined value P1 or T1 or is estimated to exceed the predetermined value P1 or T1, the controller 50 (specifically, an exterior blower control section 50b) operates the exterior blower 21.

In this configuration, even when the compressor 23 is stopped, heat of the engine coolant can be radiated to the outside air to restrict the temperature increase in the engine room. Therefore, in the same manner as the above-described first embodiment, the temperature increase of the refrigerant can be restricted to restrict the pressure increase of the refrigerant.

Other Embodiments

The aforementioned embodiments can be properly combined together. For example, the aforementioned embodiments can be modified in various forms as described below.

(1) A member having a large thermal capacity may be provided on a refrigeration cycle unit 40. For example, a casing of the refrigeration cycle unit 40 is composed of the member having a large thermal capacity. Accordingly, a refrigerant in the refrigeration cycle unit 40 is restricted from increasing to a high temperature.

A configuration in which a fence which limits a heat exchange amount with respect to an outside air is disposed in a coolant heater 15 and a cooling accumulation material between the fence and the coolant heater 15 in contact with the coolant heater 15 is disposed may be adopted. A first pump 11 may be stopped when the pressure Pc or the temperature Tc of the refrigerant in the refrigeration cycle 22 is determined to be higher than the predetermined value P1 or T1 or when the pressure Pc or the temperature Tc of the refrigerant in the refrigeration cycle 22 is estimated to exceed the predetermined value P1 or T1.

(2) Although the refrigeration cycle unit 40 is disposed in an engine room 1, the refrigeration cycle unit 40 may be disposed in a space where a heat generating device such as a power engine of the vehicle (for example, a traveling electric motor) and a fuel cell are disposed. In this case, even when the refrigeration cycle unit 40 is affected by heat that the power engine and the fuel cell generate, the pressure of the refrigerant in the refrigeration cycle unit 40 is restricted from excessively increasing.

(3) In the above-described embodiments, a coolant is used as a heat medium flowing in a cooler core 17. However, various types of media such as oil may be used as the heat medium.

A nanofluid may be used as the heat medium. The nanofluid is a fluid into which nanoparticles with a particle size in the order of nanometer are mixed. The mixture of nanoparticles into the heat medium can offer the following operational effects in addition to an operational effect of decreasing the solidifying point of coolant (i.e., so-called antifreezing fluid) containing ethylene glycol.

That is, the following operational effects can be obtained: an operational effect of improving thermal conductivity in a specific temperature band; an operational effect of increasing the heat capacity of the heat medium; an operational effect of preventing the rusting of metal pipes or degradation of rubber pipes; and an operational effect of increasing the fluidity of the heat medium at a very low temperature.

These operational effects are changed in various forms due to the constituents, particle shapes, and mixing ratio of nanoparticles and additives to nanoparticles.

Since the thermal conductivity can be improved in this manner, also when a small amount of heat medium is used compared to the coolant containing ethylene glycol, an equivalent level of cooling efficiency can be obtained.

Since the heat capacity of the heat medium can be increased, an amount of stored thermal energy (i.e., stored thermal energy due to sensible heat) of the heat medium can be increased.

Since the amount of stored thermal energy is increased, even if the compressor 23 is not operated, adjustment of the cooling and heating temperature of the device can be performed by using the stored thermal energy for a certain amount of time. Accordingly, a power of a vehicular heat management system 10 can be saved.

An aspect ratio of a nanoparticle is preferably greater than or equal to 50. The reason for this is that a sufficient thermal conductivity can be obtained. The aspect ratio is a shape index that represents the ratio of the width to the height of a nanoparticle.

The nanoparticle containing any one of Au, Ag, Cu, and C can be used. Specifically, the following can be used as constituent atoms of the nanoparticle: an Au nanoparticle, an Ag nanowire, a CNT (i.e., carbon nanotube), a graphene, a graphite core shell nanoparticle (i.e., particle with a structure such as a carbon nanotube to surround the aforementioned atom), a CNT containing Au nanoparticles, and the like.

(4) In the refrigeration cycle 22 in the above-described embodiments, a fluorocarbon refrigerant is used as the refrigerant; however, the type of the refrigerant is not limited to the fluorocarbon refrigerant, and carbon dioxide natural refrigerants or hydrocarbon refrigerants may be used.

In the embodiments described above, the refrigeration cycle 22 is a subcritical refrigeration cycle in which the high pressure-side refrigerant pressure does not exceed a critical pressure of the refrigerant; however, the refrigeration cycle 21 may be a supercritical refrigeration cycle in which the pressure of high-pressure side refrigerant exceeds the critical pressure of the refrigerant.

(5) In the above-mentioned embodiments, the example in which the vehicular heat management system 10 is applied to a hybrid vehicle has been described. Alternatively, the vehicular heat management system 10 may be applied to an electric vehicle that is not provided with an engine and obtains a drive force for the traveling of a vehicle from a traveling electric motor, a fuel cell motor vehicle traveling by an electric power obtained by a reaction between hydrogen and oxygen and the like.

What is claimed is:
1. A vehicular heat management system comprising:
a compressor that draws and discharges a refrigerant;
a heat-medium heating heat exchanger that causes a heat exchange between the refrigerant discharged from the compressor and a heat medium other than air, and that heats the heat medium;
a decompression part that decompresses and expands the refrigerant after exchanging heat in the heat-medium heating heat exchanger;
a heat-medium cooling heat exchanger that cools the heat medium by causing a heat exchange between the refrigerant decompressed and expanded in the decompression part and the heat medium;
a heat-medium-air heat exchanger that causes a heat exchange between the heat medium and air;
a pump that circulates the heat medium to the heat-medium cooling heat exchanger and the heat-medium-air heat exchanger;
a pump control section; and
a determination section that determines whether a pressure or a temperature of the refrigerant is determined to be higher than a predetermined value or is estimated to exceed the predetermined value, wherein
the pump control section is configured to operate the pump in response to the compressor being stopped and the determination section determining that the pressure or the temperature is higher than a predetermined value or is estimated to exceed the predetermined value.

2. A vehicular heat management system comprising:
a compressor that draws and discharges a refrigerant;
a heat-medium heating heat exchanger that causes a heat exchange between the refrigerant discharged from the compressor and a heat medium other than air, and that heats the heat medium;
a heat-medium-air heat exchanger that causes a heat exchange between the heat medium and air;
a pump that circulates the heat medium to the heat-medium heating heat exchanger and the heat-medium-air heat exchanger;
a pump control section; and
a determination section that determines whether a pressure or a temperature of the refrigerant is determined to be higher than a predetermined value or is estimated to exceed the predetermined value, wherein
the pump control section is configured to operate the pump in response to the compressor being stopped and the determination section determining that the pressure or the temperature is higher than a predetermined value or is estimated to exceed the predetermined value.

3. A vehicular heat management system comprising:
a compressor that draws and discharges a refrigerant;
a heat-medium heating heat exchanger that causes a heat exchange between the refrigerant discharged from the compressor and a heat medium other than air, and that heats the heat medium;
a decompression part that decompresses and expands the refrigerant after exchanging heat in the heat-medium heating heat exchanger;
a heat-medium cooling heat exchanger that cools the heat medium by causing a heat exchange between the refrigerant decompressed and expanded in the decompression part and the heat medium;
a heat-medium-air heat exchanger that causes a heat exchange between the heat medium and air;
a pump that circulates the heat medium to the heat-medium-air heat exchanger,
a switching part that switches between a state in which the heat medium circulates between the heat-medium-air heat exchanger and the heat-medium heating heat exchanger and a state in which the heat medium circulates between the heat-medium-air heat exchanger and the heat-medium cooling heat exchanger;
a pump control section; and
a determination section that determines whether a pressure or a temperature of the refrigerant is determined to be higher than a predetermined value or is estimated to exceed the predetermined value, wherein
the pump control section is configured to operate the pump in response to the compressor being stopped and the determination section determining that the pressure or the temperature is higher than a predetermined value or is estimated to exceed the predetermined value.

4. The vehicular heat management system according to claim 3, wherein
the switching part sets the state in which the heat medium circulates between the heat-medium-air heat exchanger and the heat-medium cooling heat exchanger when the compressor is stopped and when the pressure or the temperature of the refrigerant is determined to be higher than the predetermined temperature or is estimated to exceed the predetermined value.

5. The vehicular heat management system according to claim 1, wherein
the pump control section stops the pump when the pressure or the temperature of the refrigerant becomes lower than or equal to the predetermined value after the pump is operated.

6. The vehicular heat management system according to claim 1, wherein
the pump control section stops the pump when a predetermined time elapses after the pump starts.

7. The vehicular heat management system according to claim 1, further comprising:
a blower blowing air to the heat-medium-air heat exchanger; and
an air-blow control section that operates the blower, wherein
the air-blow control section operates the blower when the compressor is stopped and when the pressure or the temperature of the refrigerant is determined to be higher than the predetermined value or is estimated to exceed the predetermined value.

* * * * *